US011927502B2

(12) United States Patent
Hong et al.

(10) Patent No.: US 11,927,502 B2
(45) Date of Patent: Mar. 12, 2024

(54) SIMULATING REALISTIC TEST DATA FROM TRANSFORMED REAL-WORLD SENSOR DATA FOR AUTONOMOUS MACHINE APPLICATIONS

(71) Applicant: NVIDIA Corporation, Santa Clara, CA (US)

(72) Inventors: Jesse Hong, Edgewater, NJ (US); Urs Muller, Keyport, NJ (US); Bernhard Firner, Highland Park, NJ (US); Zongyi Yang, Eatontown, NJ (US); Joyjit Daw, New York, NY (US); David Nister, Bellevue, WA (US); Roberto Giuseppe Luca Valenti, Holmdel, NJ (US); Rotem Aviv, San Diego, CA (US)

(73) Assignee: NVIDIA Corporation, Santa Clara, CA (US)

(*) Notice: Subject to any disclaimer, the term of this patent is extended or adjusted under 35 U.S.C. 154(b) by 314 days.

(21) Appl. No.: 16/860,824

(22) Filed: Apr. 28, 2020

(65) Prior Publication Data
US 2020/0339109 A1     Oct. 29, 2020

Related U.S. Application Data

(60) Provisional application No. 62/840,048, filed on Apr. 29, 2019.

(51) Int. Cl.
*G01M 17/007* (2006.01)
*B60W 30/08* (2012.01)
(Continued)

(52) U.S. Cl.
CPC .......... *G01M 17/007* (2013.01); *B60W 30/08* (2013.01); *B60W 30/12* (2013.01);
(Continued)

(58) Field of Classification Search
CPC .......... G01M 17/007; B60W 60/0011; B60W 30/08; B60W 30/12; B60W 30/143;
(Continued)

(56) References Cited

U.S. PATENT DOCUMENTS 9,494,439 B1   11/2016 Ross et al.
10,885,698 B2   1/2021 Muthler et al.
(Continued)

FOREIGN PATENT DOCUMENTS

CN    105807630 A    7/2016
CN    110618678 A    12/2019

OTHER PUBLICATIONS

International Preliminary Report on Patentability received for PCT Application No. PCT/US2020/030296, dated Nov. 11, 2021, 9 pages.
(Continued)

*Primary Examiner* — Michael D Lang
(74) *Attorney, Agent, or Firm* — Taylor English Duma L.L.P.

(57) ABSTRACT

In various examples, sensor data recorded in the real-world may be leveraged to generate transformed, additional, sensor data to test one or more functions of a vehicle—such as a function of an AEB, CMW, LDW, ALC, or ACC system. Sensor data recorded by the sensors may be augmented, transformed, or otherwise updated to represent sensor data corresponding to state information defined by a simulation test profile for testing the vehicle function(s). Once a set of test data has been generated, the test data may be processed by a system of the vehicle to determine the efficacy of the system with respect to any number of test criteria. As a result, a test set including additional or alternative instances of sensor data may be generated from real-world recorded sensor data to test a vehicle in a variety of test scenarios—

(Continued)

including those that may be too dangerous to test in the real-world.

19 Claims, 10 Drawing Sheets

(51) Int. Cl.
*B60W 30/12* (2020.01)
*B60W 30/14* (2006.01)
*B60W 50/00* (2006.01)
*B60W 50/04* (2006.01)
*B60W 60/00* (2020.01)
*G06V 10/774* (2022.01)
*G06V 20/56* (2022.01)
*G07C 5/08* (2006.01)
*G06F 11/36* (2006.01)

(52) U.S. Cl.
CPC .......... *B60W 30/143* (2013.01); *B60W 50/04* (2013.01); *B60W 50/045* (2013.01); *B60W 60/0011* (2020.02); *G06V 10/774* (2022.01); *G06V 20/56* (2022.01); *G07C 5/08* (2013.01); *B60W 2050/0028* (2013.01); *G06F 11/3684* (2013.01); *G06F 11/3696* (2013.01)

(58) Field of Classification Search
CPC .............. B60W 50/04; B60W 50/045; B60W 2050/0028; G06V 10/774; G06V 20/56; G07C 5/08; G06F 11/3684; G06F 11/3696
See application file for complete search history.

(56) References Cited

U.S. PATENT DOCUMENTS

| | | | |
|---|---|---|---|
| 11,150,660 B1* | 10/2021 | Kabirzadeh | G05D 1/0088 |
| 2011/0054823 A1 | 3/2011 | Long et al. | |
| 2016/0275361 A1 | 9/2016 | Le et al. | |
| 2017/0109458 A1 | 4/2017 | Micks et al. | |
| 2017/0109928 A1 | 4/2017 | Micks et al. | |
| 2018/0300620 A1 | 10/2018 | Gerardo Castro et al. | |
| 2019/0065933 A1 | 2/2019 | Bogdoll et al. | |
| 2019/0244040 A1* | 8/2019 | Herrmann | G06V 20/56 |
| 2020/0209874 A1* | 7/2020 | Chen | G06F 30/15 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https:/en.wikipedia.org/wiki/IEC_61508, accessed on Apr. 1, 2022, 7 pages.

International Search Report and Written Opinion received for PCT Patent Application No. PCT/US2020/030296, dated Aug. 21, 2020, 11 pages.

Hong, Jesse; First Office Action for Chinese Patent Application No. 202080032512.X, filed Apr. 28, 2020, dated Nov. 22, 2023, 10 pgs. ** English Abstract Included.

* cited by examiner

SIMULATING REALISTIC TEST DATA FROM TRANSFORMED REAL-WORLD SENSOR DATA FOR AUTONOMOUS MACHINE APPLICATIONS

CROSS-REFERENCE TO RELATED APPLICATIONS

This application claims the benefit of U.S. Provisional Application No. 62/840,048, filed on Apr. 29, 2019, which is hereby incorporated by reference in its entirety.

BACKGROUND

Autonomous driving systems and advanced driver assistance systems (ADAS) may leverage various sensors to perform various tasks—such as lane keeping, lane changing, lane assignment, camera calibration, turning, stopping, path planning, and localization. For example, for autonomous and ADAS systems to operate independently and efficiently, an understanding of the surrounding environment of the vehicle in real-time or near real-time may be generated. This understanding may include information as to locations of objects, obstacles, lanes and/or intersections in the environment with respect to various demarcations, such as lanes, road boundaries, intersections, and/or the like. The information of the surrounding environment may be used by a vehicle when making decisions, such as when and/or where to brake, where and for how long to stop, when and if to change lanes, how fast to drive, etc.

As an example, ADAS systems may employ automatic emergency braking (AEB) systems (and/or collision mitigation warning (CMW) systems) to aid a vehicle in safely navigating an environment by automatically activating brakes—and/or providing an indication that brakes should be activated—in various situations to avoid potential collisions. For example, an AEB system—when triggered—may be configured to perform tasks such as pre-charging brakes, slowing down, and/or bringing the vehicle to a stop. Information regarding locations and attributes of objects and/or lanes in an environment of an autonomous or semi-autonomous vehicle may prove valuable to the AEB system when making obstacle avoidance and/or control decisions related thereto—such as where to stop, when to brake, where to start braking, and/or the like. Due to the safety critical nature of AEB systems, these systems must be rigorously tested to verify safe operation in deployment. For example, testing may be performed to determine whether the AEB system accurately triggers brakes at the right time or location when the vehicle is travelling towards an object at any of a variety of speeds. However, testing a vehicle's AEB system in a real-world environment may prove dangerous, and simulating a real-world environment for testing may be time consuming and expensive while still not producing accurate and reliable results.

For example, some conventional AEB and/or CMW systems may be tested by using replays of sensor data recorded while a vehicle is driving on a test track. The test track may include targets such as balloons, foam, and/or cardboard cutouts to represent objects such as vehicles, pedestrians, road signs, etc. Sensor data may be recorded as the vehicle drives towards the targets, and this sensor data may be used to test the AEB system for accuracy, reliability, and safety. However, to accurately and sufficiently test the operability of an AEB system, a large amount of sensor data must be collected in different operating conditions. Collecting such a large and diverse set of sensor data using field testing can be extremely time consuming and expensive, and ultimately may not accurately reflect real-world performance of the AEB system—e.g., because the test objects may appear and be registered differently by the sensors than actual objects (e.g., foam, cardboard, or object cutouts may not provide the same reflective and/or appearance characteristics for image data, LIDAR data, and/or SONAR data as a respective real-world object would).

In some other conventional AEB and/or CMW systems, testing may be performed using simulations created using entirely-synthetically generated sensor data within a virtual environment. Such conventional systems allow for a large amount of sensor data to be generated synthetically; however, synthetically generated sensor data by its very nature may not be as reliable as sensor data collected in real-world environments. As such, an AEB system's performance in the real-world may not be reflected accurately in the tests performed on synthetically generated sensor data. As a result, these conventional systems are unable to provide accurate assessment of an AEB and/or CMW system's performance and/or may prove falsely reliable based on synthetic test data but perform unsafely when deployed or tested in real-world environments.

SUMMARY

Embodiments of the present disclosure relate to simulating realistic test data from transformed real-world sensor data for autonomous machine applications. Systems and methods are disclosed that leverage real-world sensor data captured from sensors on a vehicle to generate transformed or updated test data corresponding to desired vehicle states in order to test a function of the vehicle—such as a function of an automatic emergency braking (AEB) system, a collision mitigation warning (CMW) system, an automatic lane departure warning (ALDW or LDW) system, an automatic lane change (ALC) system, and/or an adaptive cruise control (ACC) system.

In contrast to conventional systems, such as those described above, the systems and methods of the present disclosure may leverage recorded sensor data from a vehicle operating in the real-world on real-world objects to generate test data for use in testing various functions of an autonomous machine—such as an autonomous or semi-autonomous vehicle. For example, test data may be generated by augmenting, transforming, and/or updating instances of recorded sensor data that correspond to actual state information closely resembling desired state information of the vehicle at certain simulation points. The simulation points and the corresponding desired state information may be associated with a simulation profile generated or determined based on the vehicle's physics model, a desired initial speed for testing the function(s) of the autonomous vehicle, and/or other criteria. In some examples, the instances of the recorded sensor data selected to correspond to a simulation point of the profile may be transformed using one or more transformations—e.g., a viewport transformation—to generate the corresponding updated instances. In embodiments, such as where an instance of the recorded sensor data has actual state information within a threshold similarity to the desired state information of the simulation point, the recorded instance may be used without transformation, augmentation, or the like. Once a test set of data has been generated from the recorded sensor data, the test set may be used to test a function(s) of the vehicle, and the test results may be used directly or indirectly (e.g., via decoding) to determine the accuracy of the autonomous machine application.

As a result of transforming real-world sensor data to generate test data for testing functionality of a vehicle, valuable time and compute resources may be saved that would otherwise—in conventional systems—be used to record and process additional real-world data. As such, the process of transforming real-world sensor data based on a simulation profile to generate test data may be comparatively less expensive, less computationally intense, and more scalable than conventional systems, as the system may increase the amount of test data—that is more accurate, reliable, and more closely resembles the real-world sensor data—without requiring the use of simulated or virtual data or the recording of a large amount of sensor data in real-world staged test situations. In addition, the test data may be captured while a vehicle travels backwards from a location close to an object, thereby allowing the test data to be used to simulate close encounters with objects while maximizing safety of data collection (e.g., where conventional systems would be required to travel toward the object and attempt to stop prior to the object, which could be dangerous).

BRIEF DESCRIPTION OF THE DRAWINGS

The present systems and methods for transforming real-world sensor data based on a simulated profile to generate test data for autonomous machine applications are described in detail below with reference to the attached drawing figures, wherein.

DETAILED DESCRIPTION

Figure 1:
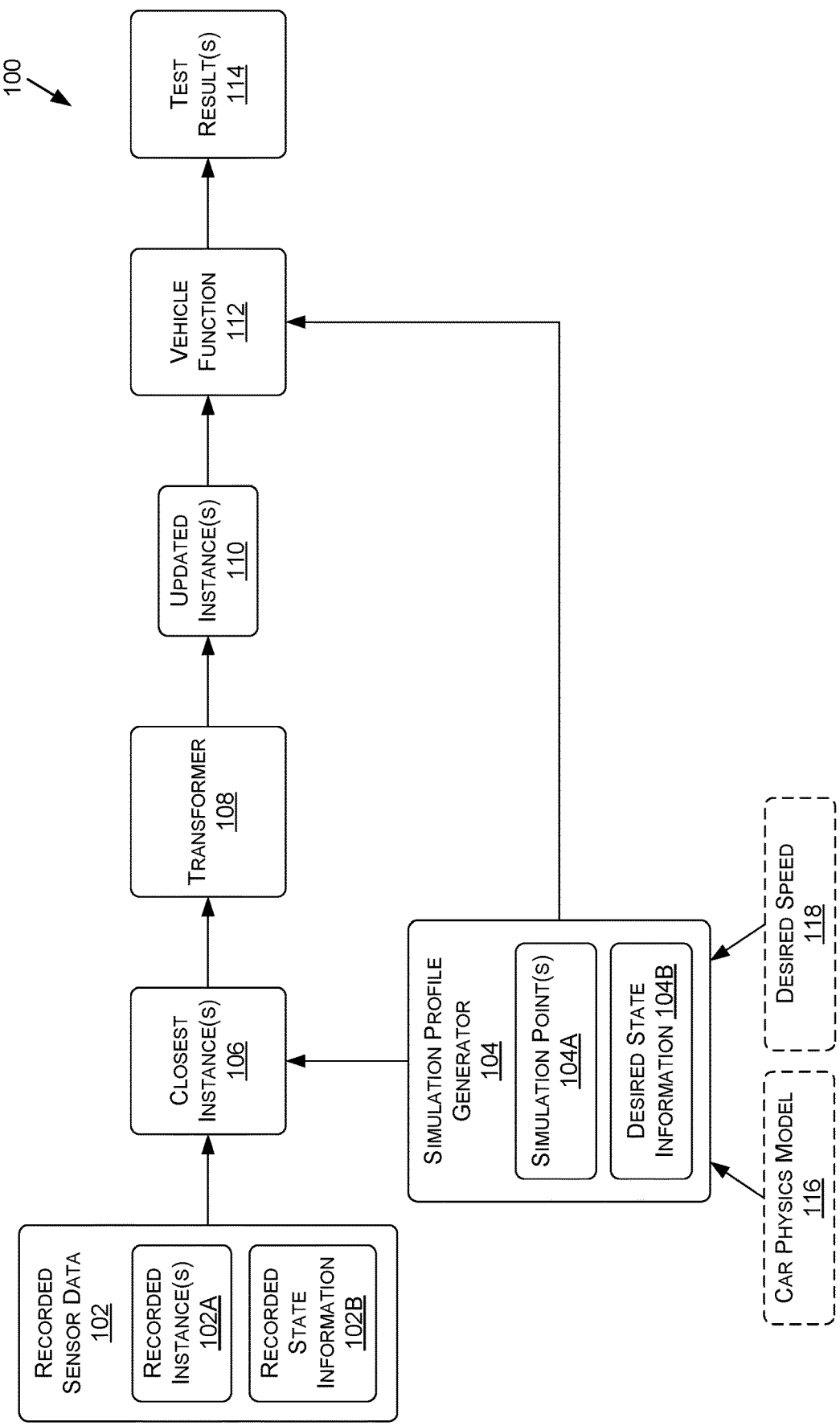
FIG. 1 is an example data flow diagram illustrating an example process for generating test data for testing one or more functions of an autonomous machine, in accordance with some embodiments of the present disclosure.

Systems and methods are disclosed related to transforming real-world sensor data based on a simulated profile to generate test data for autonomous machine applications. Although the present disclosure may be described with respect to an example autonomous vehicle 600 (alternatively referred to herein as "vehicle 600" or "ego-vehicle 600," an example of which is described with respect to FIGS. 6A-6D), this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types. Further, although testing with respect to AEB systems is described primarily herein, this is not intended to be limiting, and any systems of a vehicle may be tested such as, but not limited to, automatic emergency braking (AEB), collision mitigation warning (CMW), adaptive cruise control (ACC), blind spot monitoring (BSM), cross traffic warning (CTW), etc. In addition, although the present disclosure may be described with testing for vehicle applications, this is not intended to be limiting, and the systems and methods described herein may be used in augmented reality, virtual reality, robotics, security and surveillance, autonomous or semi-autonomous machine applications, and/or any other technology spaces where generating additional sensor data from recorded sensor data may be useful for testing various functions and/or processes of the respective vehicle or actor type.

The current systems and methods provide techniques to transform, augment, or otherwise update recorded sensor data to simulate different situations—such as different vehicle speeds, different vehicle orientations, different surrounding actor speeds, etc. In addition, because the sensor data may be updated, the original sensor data may be generated in a real-world environment and/or on a test tracks using real objects. For example, the vehicle may drive toward and/or away from a real-world object at a slow and safe speed, and the generated sensor data may be augmented or transformed to simulate a less safe driving scenario—e.g., where the vehicle is driving at a high speed toward an object. The performance of an AEB, CMW, ACC, and/or other system associated with the vehicle may then be tested using the transformed or updated sensor data.

In order to generate the transformed sensor data, sensor data generated during data collection may be tagged with associated state information—such as location, speed, and/or pose or orientation information (collectively referred to herein as "state information"). During testing, simulation profiles or trajectories may be generated to determine conditions for testing a system—or function thereof—of a vehicle. The simulation profiles may include any number of points, and each point may be associated with desired state information. In some examples, the simulation profile may be generated based on a desired speed and distance—e.g., starting speed for the ego-vehicle and distance to a leading object or vehicle—for testing an AEB system of the vehicle. A comparison between the actual state information for a particular point and the state information from the sensor data may be performed, and instances of the sensor data having associated state information most closely resembling the desired state information—and corresponding to a prior location in space, in embodiments—for the point may be selected. The closest (prior) instances of the recorded sensor data to each of the points of the simulation profile may then be used to generate the transformed sensor data to test the performance of the AEB system. In some embodiments, to generate the transformed sensor data from the recorded sensor data, a viewport transformation for each pixel may be performed based on intrinsic and/or extrinsic parameters of the sensor that captured the sensor data. In some embodiments, in addition to or alternatively from updating the sensor data, an instance of the recorded sensor data associated with state information most closely resembling the desired state information for a given point on the simulation profile may be used as the sensor data instance for that point.

As such, live perception from sensor data recorded in a real-world environment may be leveraged to generate transformed sensor data for testing the vehicle under varying state conditions. This may allow for increasing the amount of test data for the systems of the vehicle while simultaneously generating test data that is more accurate, reliable, and closer to real-world sensor data than conventional approaches—e.g., where test data is generated using fake objects or on synthetic data from a simulated test environment. As a result, the amount of time required to generate test data or perform tests, as well as the expense of generating and simulating virtual test environments and/or real-world test environments, is reduced.

Transformed Test Data Generation System

Recorded sensor data (e.g., image data, LIDAR data, RADAR data, etc.) may be received and/or generated using sensors (e.g., cameras, RADAR sensors, LIDAR sensors, etc.) located or otherwise disposed on an autonomous or semi-autonomous vehicle. The recorded sensor data may include sensor data recorded as various instances while the vehicle is moving towards, away, adjacent to, or otherwise with respect to an object(s). Other sensors (e.g., GNSS, inertial measurement unit (IMU), speed sensors, steering sensors, etc.) may be used to receive and/or generate state information for the vehicle at each of the various instances of the sensor data. Each instance of the sensor data may thus represent the sensory field of the sensor and the associated state information for the vehicle and/or the object(s). In some examples, the state information may be actual state information of the vehicle such as location, speed, acceleration, orientation, pose, etc.

In order to test the AEB system, various testing conditions may be used to determine how the AEB system performs. These various testing conditions may be represented by simulation profiles or trajectories that are generated for testing the AEB systems. In some embodiments, the simulation profiles may include any number of points, and each point may have associated (or desired) state information. The desired state information may include a desired or expected speed, location, acceleration, orientation, and/or pose of the vehicle for the particular test case scenario. In some examples, the desired state information may be determined based on a desired initial speed of the vehicle and/or a desired distance(s) to another object to the environment.

In some embodiments, the simulation profile may be generated to correspond to a particular frequency of the sensor as different sensors may have different frequencies—e.g., a camera may have a frequency of 30 Hz, an IMU sensor may have a frequency of 100-200 Hz, a RADAR sensor may have a frequency of 15-30 Hz, etc). As a result, each point along the profile may be associated with a particular sensor (e.g., camera, then RADAR, then IMU, then IMU, then IMU, then camera, then RADAR, then IMU, and so on). Thus, where the recorded sensor data represents actual state information generated from any of a number of different sensor types with different frequencies, the simulation profile may correspond to one or more of the sensors with some sampling frequency at each point. In addition, in some embodiments, the simulated profiles may be generated with more or less points to simulate the effect of lower or higher sampling frequencies of particular sensors, and/or to simulate the dropping out of sensors (e.g., less points over some portion of the simulated profile to simulate one or more of the sensors malfunctioning). As such, the simulation profile may capture dropout of sensors, noise in sensor data, jitter in timing of the sensor data generation, and/or other aspects that may allow for further diversifying the test scenarios.

Once the profile is generated, and the desired state information is known to the system, the instance of the sensor data having actual state information most closely resembling that of the desired state information at each point may be selected for association with the respective point. This instance of the sensor data may be referred to as the closest instance of the sensor data, and may be used—with or without updating—as the sensor data for the point. Where the sensor data is to be transformed or augmented, the closest instance for each point may be transformed to align with the desired state information. In some embodiments, a zoom operation may be used to transform the closest instance. In other examples, a viewport transformation may be applied to each pixel of the closest instance to update the sensor data such that the sensor data—now referred to as transformed or updated sensor data—more closely aligns with the desired state information. In embodiments where a viewport transform is executed, a flat surface assumption may be used.

In this way, test data more closely resembling real-world data may be automatically generated in an efficient and accurate manner to test the function(s) of the vehicle in a variety of scenarios. As such, by leveraging and modifying a limited amount of recorded sensor data, a larger pool of accurate and reliable test data may be generated while saving the expense and time of generating test data on fake or simulated objects and/or within virtual environments.

With reference to FIG. 1, FIG. 1 is an example data flow diagram illustrating an example process 100 for generating test data for testing various functions of an autonomous machine, in accordance with some embodiments of the present disclosure. It should be understood that this and other arrangements described herein are set forth only as examples, and the ordering of the components and/or processes may be adjusted without departing from the scope of the present disclosure. Further, additional or alternative components and/or processes others than those described herein may be implemented. In some embodiments, the features, functionality, and/or components used within the process 100 may be similar to that of the autonomous vehicle 600 (FIGS. 6A-6D) and/or example computing device 700 (FIG. 7). In addition, in some embodiments, additional and/or alternative features, functionality, and/or components may be used within the process 100 other than those described herein without departing from the scope of the present disclosure.

The process 100 may include generating and/or receiving recorded data 102 from one or more sensors. The recorded sensor data 102 may be received, as a non-limiting example, from one or more sensors of a vehicle (e.g., vehicle 600 of FIGS. 6A-6C and described herein). The recorded sensor data 102 may be used by the vehicle, and within the process 100, to test functions of one or more systems of the vehicle using test data generated by transforming, augmenting, or otherwise updating real-world sensor data based on a simulation profile. For example, the recorded sensor data 102 may include, without limitation, sensor data recorded at various instances while the vehicle is moving towards, away, adjacent to, or otherwise with respect to an object(s). As another example, the recorded sensor data 102 may include virtual sensor data generated from any number of sensors of a virtual vehicle or other virtual object. In such an example, the virtual sensors may correspond to a virtual vehicle or other virtual object in a simulated environment (e.g., used for testing, training, and/or validating neural network performance), and the virtual sensor data may represent sensor data captured by the virtual sensors within the simulated or virtual environment.

The recorded sensor data 102 may include recorded instance(s) 102A (e.g., recorded instances of the sensor data, such as an image, a depth map, a point cloud, etc.) and corresponding recorded state information 102B recorded by the one or more sensors of the vehicle navigating in the real-world. The recorded instance(s) 102A may include, without limitation, image data from any of the sensors of the vehicle 600 including, for example and with reference to FIGS. 6A-6C, stereo camera(s) 668, wide-view camera(s) 670 (e.g., fisheye cameras), infrared camera(s) 672, surround camera(s) 674 (e.g., 360 degree cameras), and/or long-range and/or mid-range camera(s) 678. In some embodiments, the recorded instance(s) 102A may be generated by other sensor types, such as, without limitation, RADAR sensor(s) 660, ultrasonic sensor(s) 662, LIDAR sensor(s) 664, etc.

In some embodiments, the recorded instance(s) 102A may correspond to image data representing an image(s), image data representing a video (e.g., snapshots of video), and/or sensor data representing representations of sensory fields of sensors (e.g., depth maps or point clouds for LIDAR sensors, a value graph for ultrasonic sensors, etc.). With respect to the recorded instance(s) 102A that correspond to image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the recorded instance(s) 102A may be used within the process 100 without any pre-processing (e.g., in a raw or captured format), while in other examples, the recorded instance(s) 102A may undergo pre-processing (e.g., noise balancing, demosaicing, scaling, cropping, augmentation, white balancing, tone curve adjustment, etc., such as using a sensor data pre-processor (not shown)). As used herein, the recorded instance(s) 102A may reference unprocessed image data, pre-processed image data, or a combination thereof. The recorded instance(s) 102A may include original images (e.g., as captured by one or more image sensors), down-sampled images, up-sampled images, cropped or region of interest (ROI) images, otherwise augmented images, and/or a combination thereof.

Figure 6A:
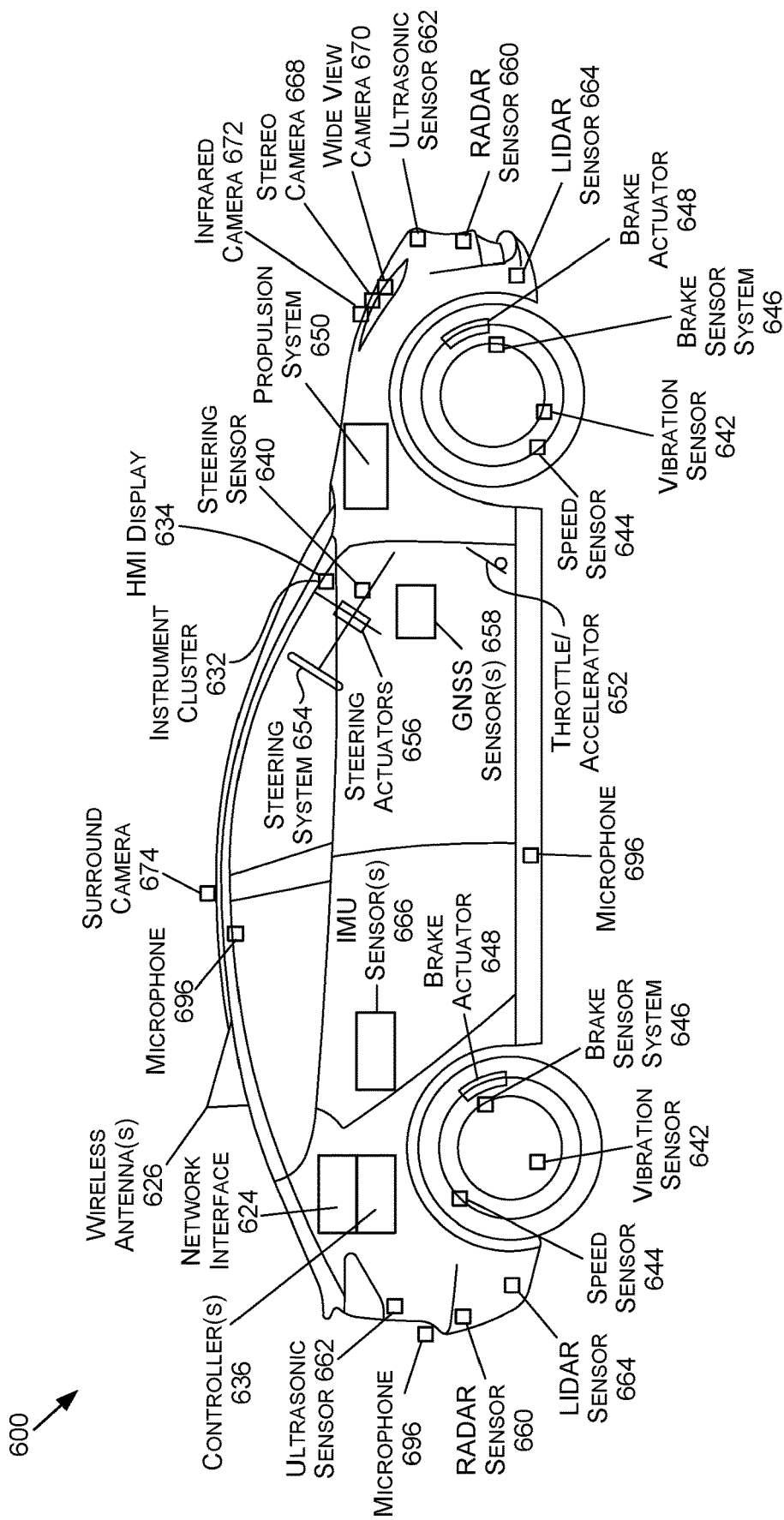
FIG. 6A is an illustration of an example autonomous vehicle, in accordance with some embodiments of the present disclosure.
Figure 6B:
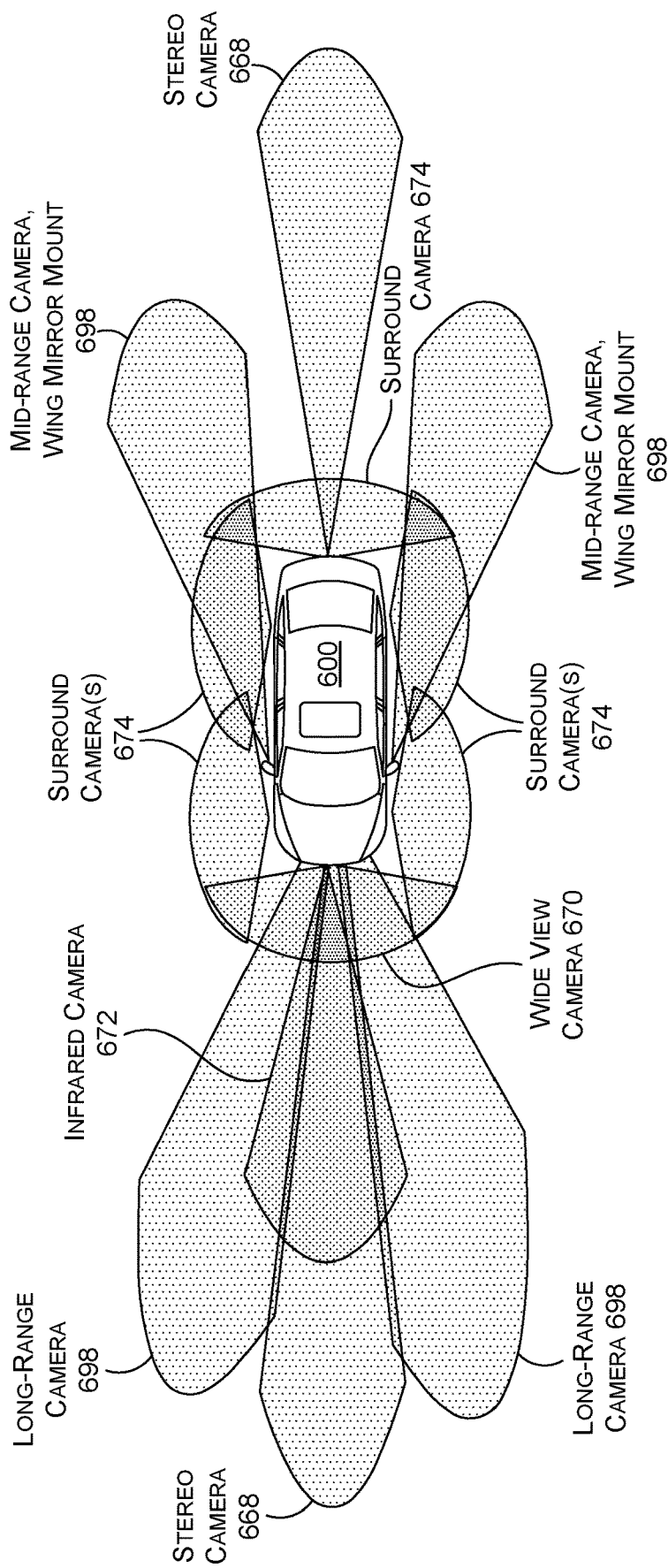
FIG. 6B is an example of camera locations and fields of view for the example autonomous vehicle of FIG. 6A, in accordance with some embodiments of the present disclosure.
Figure 6C:
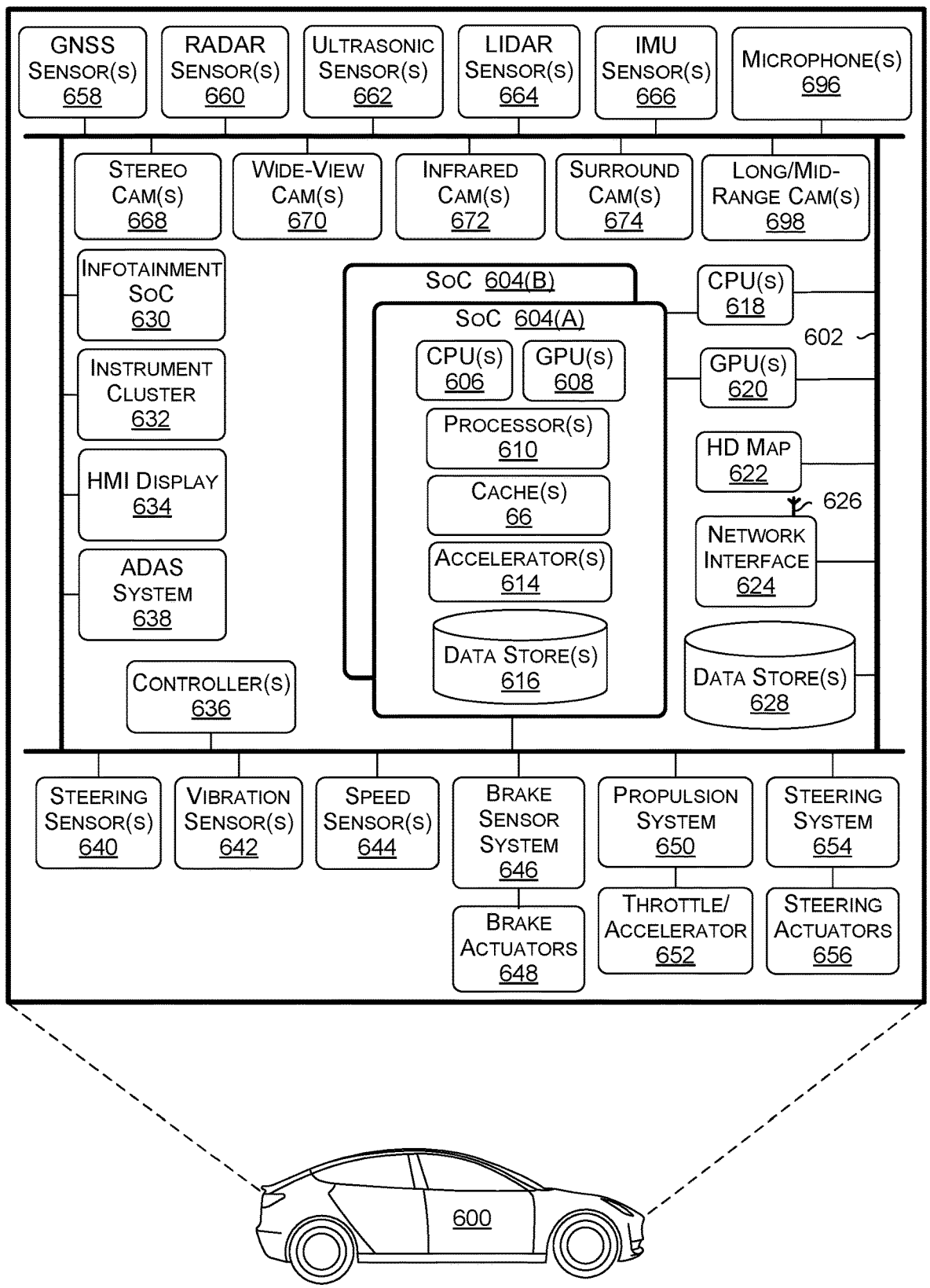
FIG. 6C is a block diagram of an example system architecture for the example autonomous vehicle of FIG. 6A, in accordance with some embodiments of the present disclosure.
Figure 7:
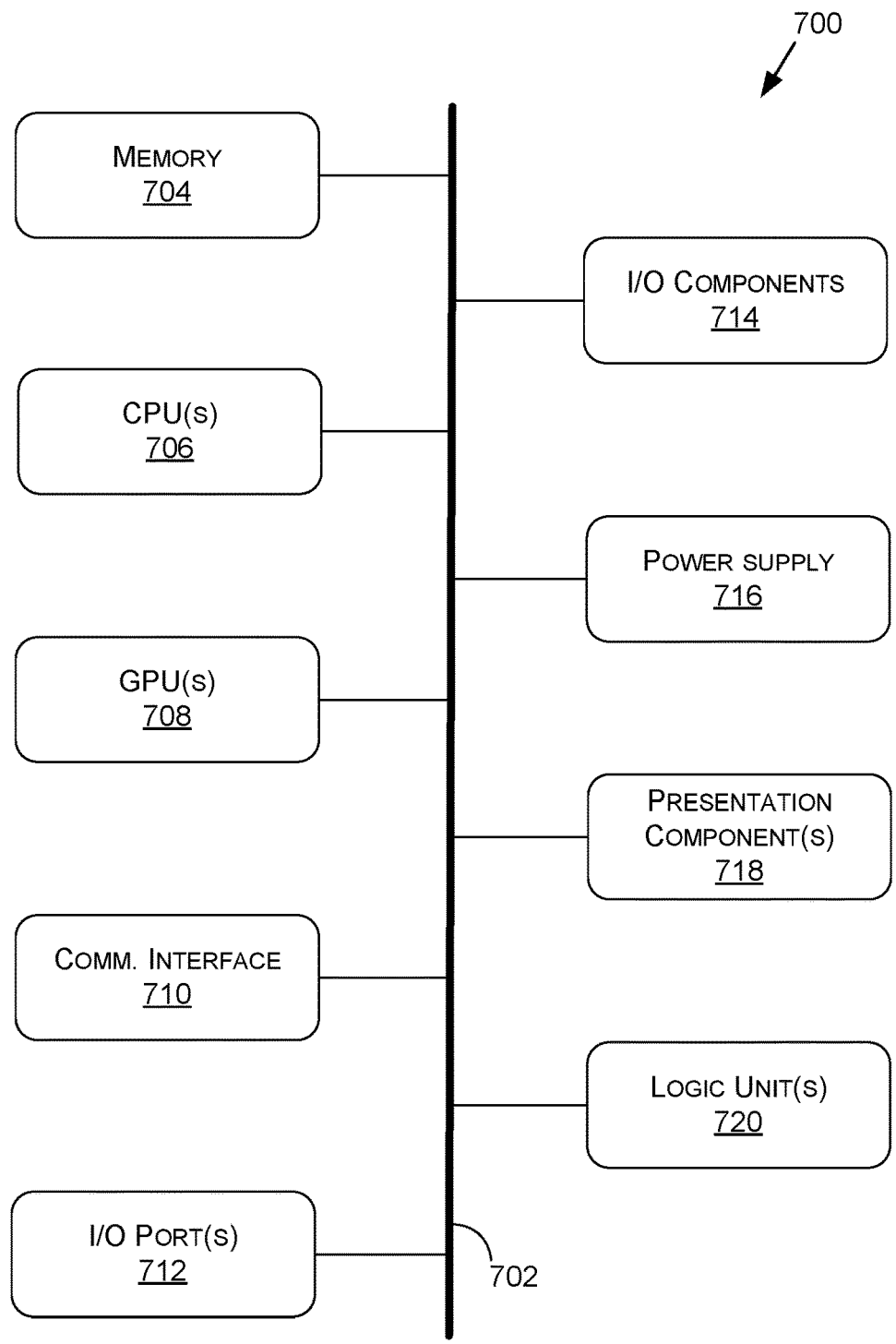
FIG. 7 is a block diagram of an example computing device suitable for use in implementing some embodiments of the present disclosure.

The recorded state information 102B may include, without limitation, state information data from any of the sensors of the vehicle 600 including, for example and with reference to FIGS. 6A-6C, a steering sensor(s) 640, a speed sensor(s) 644, a break sensor system 646, a throttle/accelerator 652, a GNSS sensor(s) 658, an IMU sensor(s) 666, and/or any other sensor types capable of generating, obtaining, and/or recording state information of the vehicle at various instances. For example, the recorded state information 102B may include, without limitation, data representative of a vehicle state at time instances corresponding to the capturing of the recorded instance(s) 102A of the recorded sensor data 102. As such, as the vehicle 600 is moving towards, away, adjacent to, or otherwise with respect to the object(s), state information may be recorded using various sensors, and the state information may be associated with (e.g., the recorded instances 102A may be tagged with—e.g., as metadata) the corresponding recorded instances. In some examples, the recorded state information 102B may include actual state information of the vehicle 600 (and/or of other detected objects in the environment), such as location, speed, acceleration, pose (e.g., orientation), and/or other state information. In this way, each of the recorded instances 102A of the recorded sensor data 102 may represent a sensory field of the sensor and may have associated recorded state information 102B that may be used within the process 100 to generate transformed or updated instances 110 of the recorded sensor data 102.

The process 100 may include a simulation profile generator 104 that receives one or more inputs—such as a car physics model 116, a desired speed 118, a distance to one or more objects, a function to be tested, a system to be tested, and/or other inputs—and generates one or more outputs. For example, using the one or more inputs, the simulation profile generator 104 may generate a simulation profile including simulation points 104A and desired state information 104B corresponding thereto. The desired state information 104B at each simulation point 104A may include one or more of a desired speed, location, acceleration (e.g., angular, scalar, etc.), orientation, pose, and/or other state information (e.g., as determined using the car physics model 116) of the vehicle 600 for the underlying testing condition(s) or scenario(s) of the simulation profile.

The simulation profile may be used to test a vehicle function (or system) 112 with regards to some testing condition(s) simulated in the simulation profile and with respect to the recorded instances 102A and/or the updated instances 110. For example, in order to determine how the vehicle function 112 performs, various testing conditions may be used. A simulation profile (e.g., trajectory for the vehicle 600) may be generated for each testing condition for testing the vehicle function (or system) 112 (e.g., a function of an AEB, ACC, or CMW system). The simulation point(s) 104A, when connected, may represent a desired trajectory of the vehicle 600 through an environment (e.g., an environment represented in the recorded instance(s) 102A). However, the recorded instance(s) 102A may not correspond directly to the desired state information 104B of each simulation point(s) 104A, so a transformer 108 may be leveraged to transform or otherwise update a closest instance(s) 106—e.g., a recorded instance(s) 102A having associated recorded state information 102B most closely resembling the desired state information 104B—to an updated instance(s) 110 that more closely resembles a sensory field (e.g., field of view) of the sensor that captured the closest instance(s) 106 were the sensor to have captured an instance of the recorded sensor data 102 while a state of the vehicle 600 corresponded to the desired state information 104B.

As described herein, in some examples, the desired state information 104B and/or the simulation point(s) 104A may be determined based on a car physics model 116 (e.g., received from a vehicle manufacturer), a desired speed 118 of the vehicle 600, a distance to one or more objects in the environment, road shape or other road information (e.g., surface material or friction coefficient, incline, curvature, etc.), weather information, etc. The car physics model 116 may include information regarding one or more sensors of the vehicle, such as location, orientation, function, technical specifications, etc., of the sensors. The car physics model 116 may also include information regarding one or more vehicle functions, such as—the maximum rate of acceleration or deceleration supported by the vehicle, the AEB system's trigger functionality, the CMW system's warning triggers, effects of environmental conditions on the various functions of the vehicle, tire sizes, tire wear and tear (e.g., friction coefficients), etc. In some examples, the car physics model 116 may also include vehicle information, such as mass, inertia number of passengers, overall weight requirements, etc. The car physics model 116 may be used to generate the simulation profile for a test condition, such as to determine a point in the simulation profile (e.g., when the vehicle 600 is a certain distance from an object(s)) where the vehicle must trigger the AEB system in order to come to a complete stop in time. In such an example, were the recorded instances 102A not to reflect the desired state information 104B when the vehicle 600 should determine to activate AEB, the recorded instance(s) 102A may not be as useful for testing the accuracy of the AEB system. As a result, a recorded instance(s) 102A—such as the closest instance(s) 106—may be selected and transformed to generate the updated instance(s) 110 that corresponds to the desired point in space or time where the vehicle 600 should activate the AEB system. If, when performing the test, the vehicle 600 does not activate AEB at the proper time, an issue may be diagnosed and remedied. As such, the simulation point(s) 104A and their respective desired state information 104B may be derived from the car physics model 116.

In other examples, the desired speed 118 may be used to generate the simulation profile for a testing condition. The desired speed 118 may be a desired initial speed of the vehicle and may be used to determine the simulation point(s) 104A where simulation instances or data are needed in order to test the vehicle function 112. The simulation point(s) 104A may be simulated vehicle positions for which updated instance(s) 110 for testing are to be generated. The desired initial speed of the vehicle can be used to determine the desired state information 104B (e.g., desired location, orientation, speed, acceleration) of the vehicle at every point of the simulation point(s) 104A defining the trajectory of the vehicle for the testing condition (e.g., desired initial vehicle speed).

The simulation profile—e.g., the desired state information 104B corresponding thereto—may be leveraged to determine the recorded instances 102A to select for transformation for each of the simulation points 104A. In some examples, the closest instance(s) 106 may be determined based on a comparison between the recorded state information 102B and the desired state information 104B. As such, the closest instance(s) 106 may represent the recorded instance(s) 102A that has a smallest deviation from the desired state information 104B. This calculation may include a calculation of differences between various state criteria—e.g., a difference in speeds, a difference in orientations or pose, a difference in location, a difference in acceleration, etc.—represented by the recorded state information 102B and the desired state information 104B.

For example, a percentage difference for each state criteria may be computed, and the recorded instance 102A with the smallest combined percentage difference may be selected as the closest instance 106. In some examples, the various state criteria may be weighted, such that having a smaller difference in location may be more important than a difference in speed, or having a smaller difference in orientation may be more important than having a smaller difference in location, etc. In such examples, the differences for various state criteria may be weighted differently, and a computed difference between the recorded state information 102B and the desired state information 104B may factor in the weights. In yet another example, the various state criteria that require the greatest transformation to the recorded sensor data 102 may be weighted as more important than state criteria that require less of a transformation. In such an example, changes in pose may be more difficult to compute updated instance(s) 110 for than changes in speed or location, so the closest instance(s) 106 may be determined by weighting the difference in pose more heavily. In some examples, weighting may be different for different sensors that generated the recorded sensor data.

In some examples, the closest instance(s) 106 may correspond to a location prior to the location from the desired state information 104B such that enough sensor data—e.g., sensor data representative of enough of the sensory field—is available to perform the transformation accurately. However, in other examples, the closest instance(s) 106 may be selected at locations prior to or after the locations for the desired state information 104B. In any example, the closest instance(s) 106 may be selected based on some criteria and may be used to generate an updated instance(s) 110 for associating with the simulation point(s) 104A corresponding to the desired state information 104B. Once determined, the closest instance(s) 106 may be associated with their respective simulation point(s) 104A and may be used—with or without augmentation, transforming, etc.—as the test or updated instance of the sensor data for that simulation point.

Figure 2:
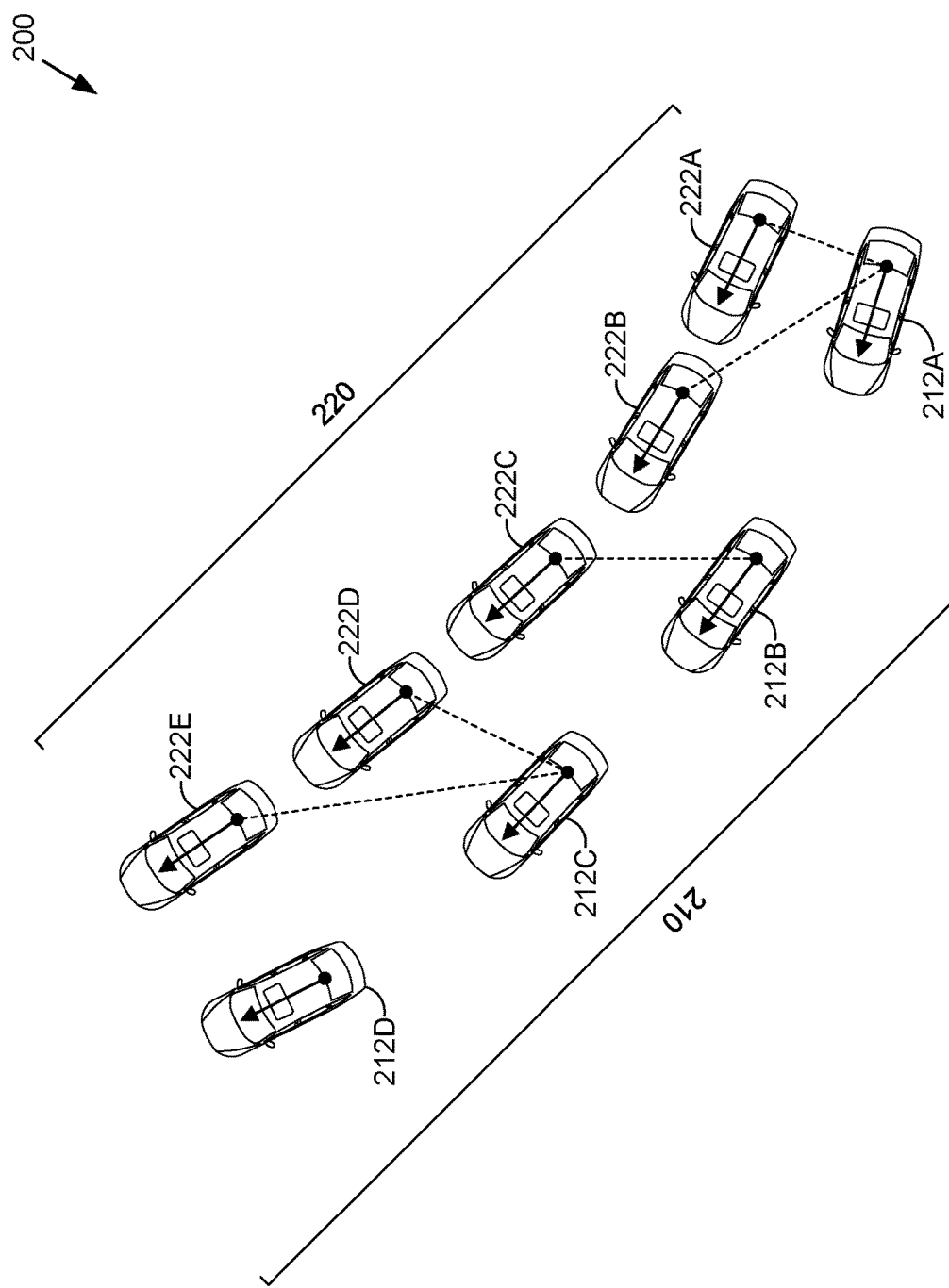
FIG. 2 depicts an example illustration of determining closest instances of sensor data based on comparing actual and desired state information of a vehicle, in accordance with some embodiments of the present disclosure.

As an example of determining the closest instance(s) 106, and with reference to visualization 200 of FIG. 2, recorded sensor data 210 may represent a recorded trajectory or actual profile of a vehicle as it moves from actual state 212A to actual state 212D with intermediate actual states 212B-212C. Desired sensor data 220 may represent a desired trajectory or a simulation profile of the vehicle as it moves from desired state 220A to desired state 222E with intermediate desired states 222B-222D at stimulation points corresponding to the desired states 222A-222E. The actual and desired state information may include vehicle locations, orientations, speeds, accelerations, pose, etc. at each recorded instance and desired instance, respectively. As a non-limiting example, the recorded sensor data 210 may correspond to a sensor of the vehicle capturing sensor data at a frame rate of the sensor and as the vehicle is moving toward an object at a speed higher than a desired simulation speed corresponding to the desired sensor data 220. In such examples, the recorded sensor data 210 may include fewer recorded instances or images than the desired sensor data required for simulating a slower speed.

For each desired state 222A-222E, a closest (most similar) instance from the recorded instances may be determined or selected based on the actual states 212A-212D. For example, the closest instance for desired state 222A may be determined to be the recorded instance at actual state 212A based on the recorded state information of the actual state 212A most closely resembling the desired state information at a simulation point corresponding to state 222A. The actual state 212A may be closest in distance, orientation, speed, and/or combination thereof to desired state 222A—and desired state 222A may be forward of the actual state 212A. Similarly closest instances for desired states 222B, 222C, 222D, and 222E may be determined to be actual states 212A, 212B, 212C, and 212C, respectively based on comparison of desired state information for each desired state to actual recorded state information for each recorded state. In some examples, the desired state information may correspond exactly to or may be within some predefined threshold similarity to the actual state information such that transformation may not be necessary—e.g., the closest instance may be used as the updated instance without transforming, augmentation, or otherwise being updated. For example, a closest instance with corresponding recorded location within a threshold distance of the desired location may be used as an updated instance to apply to the vehicle function 112. In some embodiments, one or more recorded instances may not be used as a closest instance for any desired point, such as where the recorded instances include more instances than required for the simulated profile.

In other examples, although not illustrated, the recorded sensor data 210 may be recorded at a slower vehicle speed such that there are more recorded instances or images recorded by the vehicle sensors. In some embodiments, in order to have more recorded sensor data available, the vehicle may travel very slowly during sensor data capture in order to have a more robust set of recorded sensor data from which to select the closest instances.

When a closest instance(s) 106 is selected or determined, the process 100 may include transforming the closest instance(s) 106 using a transformer 108 in order to generate the updated instance(s) 110 that more closely align with the desired state information 104B at each simulation point(s) 104A. The transformer 108 may be configured to augment or transform the closest instance 106 for each simulation point(s) 104A based on a difference between the desired state information 104B and the recorded state information 102B—e.g., to simulate sensor data (e.g., updated instance(s) 110) that resembles sensor data as if captured from the desired state of the vehicle.

In some embodiments, the transformer 108 may apply a transformation function to the closest instance(s) 106 based on intrinsic and/or extrinsic parameters of the sensor that captured the closest instance(s) 106. In non-limiting examples, the transformation function may include a viewport transformation that may transform some or all of the pixels of the closest instance(s) 106 to more accurately reflect the desired state information 104B. In such examples, such as where an image sensor is used, a flat surface assumption may be used to estimate a distance of a pixel from the recording sensor. In other examples, such as where LIDAR sensor(s), RADAR sensor(s), and/or other sensor types are used, the flat ground assumption may not be used.

In some embodiments, rather than applying a transformation function, the transformer 108 may use a magnification operation (e.g., zoom-in, zoom-out) to transform the closest instance(s) 106, a cropping operation, a rotation operation, and/or another operation. For example, the transformer 108 may slightly zoom-in on the closest instance(s) 106 to compensate for the recorded vehicle's forward motion if the closest instance(s) 106 is at a location behind the desired location. Similarly, the transformer 108 may slightly zoom-out on the closest instance(s) 106 to compensate for the recorded vehicle's backward motion if the closest instance(s) 106 is at a location in front of the desired location. In other examples, the transformer 108 may slow down or speed up playback speed of the recorded sensor data 102 to determine updated instance(s) 110 without any transformation, zoom, crop, rotation, or otherwise.

Figure 3A:
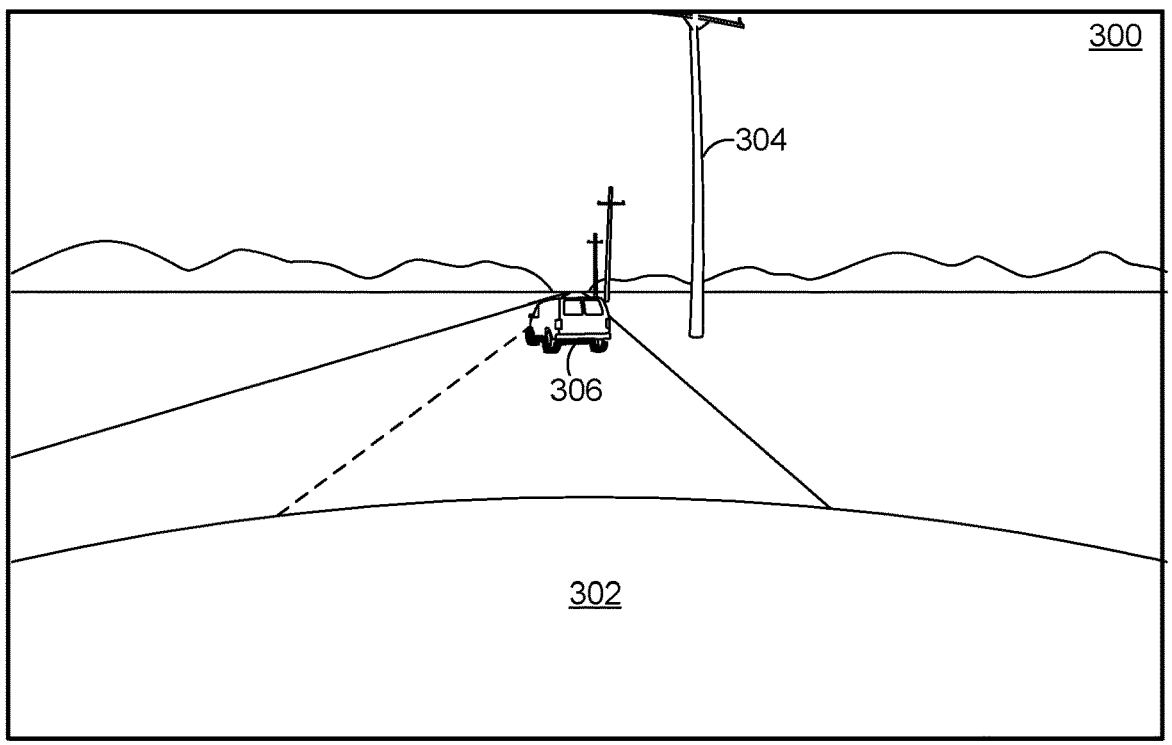
FIG. 3A depicts an example illustration of a recorded image generated by a sensor of a vehicle, in accordance with some embodiments of the present disclosure.
Figure 3B:
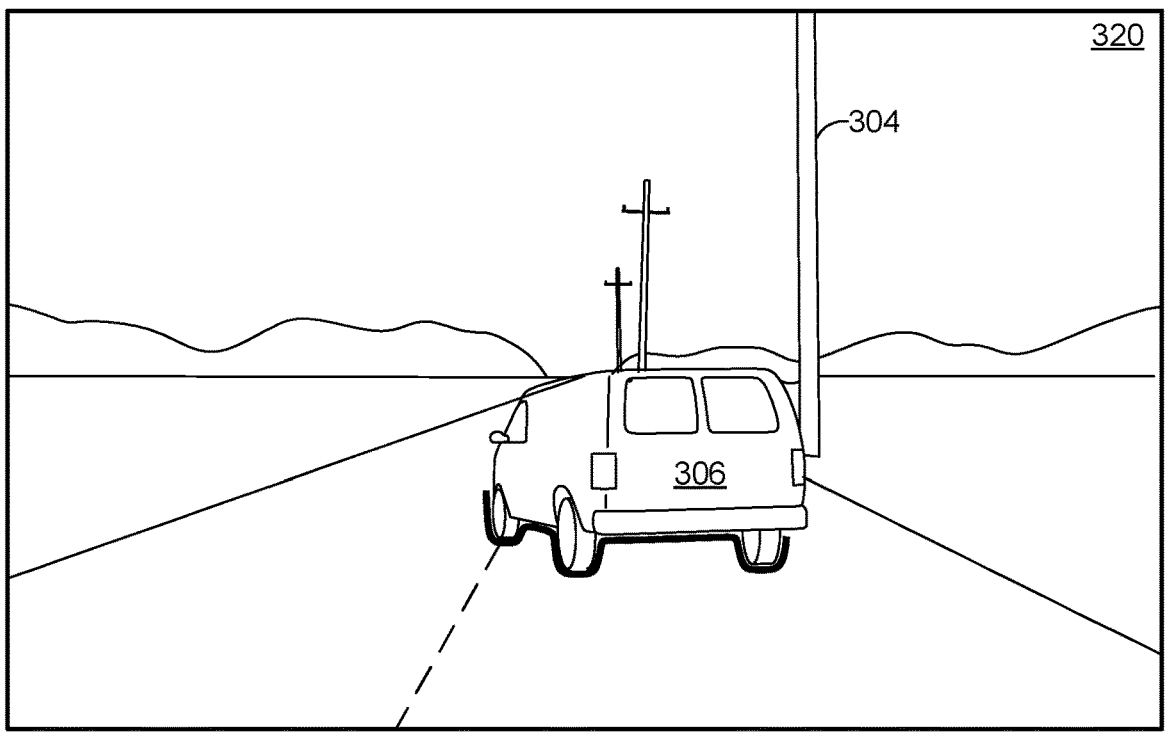
FIG. 3B depicts an example illustration of an updated image generated by transforming the recorded image of FIG. 3A, in accordance with some embodiments of the present disclosure.

As an illustrative example, and with respect to FIGS. 3A and 3B, a recorded image 300 may be transformed to generate an updated image 320 using the transformer 108. For example, the recorded image 300 may be recorded by a vehicle sensor while the vehicle 302 is moving towards utility pole 304 and van 306 (e.g., broken down in the roadway, thereby requiring an AEB system to activate as the vehicle 302 approaches if the driver is not activating the brakes, or in an autonomous application, where the system has not yet begun slowing down and obstacle avoidance functionality kicks in). The recording sensor may be a front facing camera located on the vehicle 302. A viewport transformation may be applied to the recorded image 300 by applying a transform to some or all of the pixels of the recorded image 300. As can be seen, the updated image 320 represents the vehicle being closer to the van 306 and the utility pole 304 than in the recorded image 300. However, a viewport transformation was executed, instead of a simple zoom operation, the perspective of the van 306 and the utility pole 304 have changed to more accurately reflect a sensory field of the sensor at the desired state. In some instances, the viewport transformation, or other transformation type, may adjust an appearance of objects but, because the majority of the instance of the sensor data more accurately reflects the sensor field at the desired state, the resulting updated instance 110 still provides more accurate test data.

Again referring to FIG. 1, the updated instance(s) 110 may be applied to the vehicle function 112 according to the simulation profile to generate test result(s) 114 indicating the performance of the vehicle function 112 for the desired testing scenario. The vehicle function 112 may include any function and/or any system of the vehicle to be tested, such as but not limited to AEB system, CMW systems, ACC systems, and/or the like. The updated instance(s) 110 may be applied to the vehicle function 112 to determine whether the vehicle function 112 performs in an expected, acceptable, and/or safe manner. In some examples, after testing the vehicle function 112, test result(s) 114 may be generated that indicate the performance of the vehicle function (or system) 112 on the test set including the updated instance(s) 110. For example, the test result(s) 114 for the vehicle function 112 being an AEB system may include an indication whether the AEB system was triggered correctly, when the AEB system was triggered, whether the AEB system was triggered at the right time and/or distance from an object(s), when/where/whether brakes were pre-charged, when the vehicle began slowing down or stopped, and/or the like. In some examples, the test result(s) 114 may indicate whether the vehicle function 112 was triggered or activated correctly. In some other examples, the test result(s) 114 may further simulate the effects of the vehicle function 112 controlling the vehicle's navigation. In such examples, the car physics model 116 may be used to define the simulation profile for the testing scenario, and to accurately generate the test result(s) 114 (e.g., where a physics model 116 indicates a stopping power of the vehicle, this information may be leveraged to determine whether the vehicle would stop in time from the point the vehicle function 112 was activated based on processing the updated instance(s) 110). In addition, other criteria may be used, such as the criteria described herein, including road conditions, vehicle conditions, weather, etc.

Figure 4:
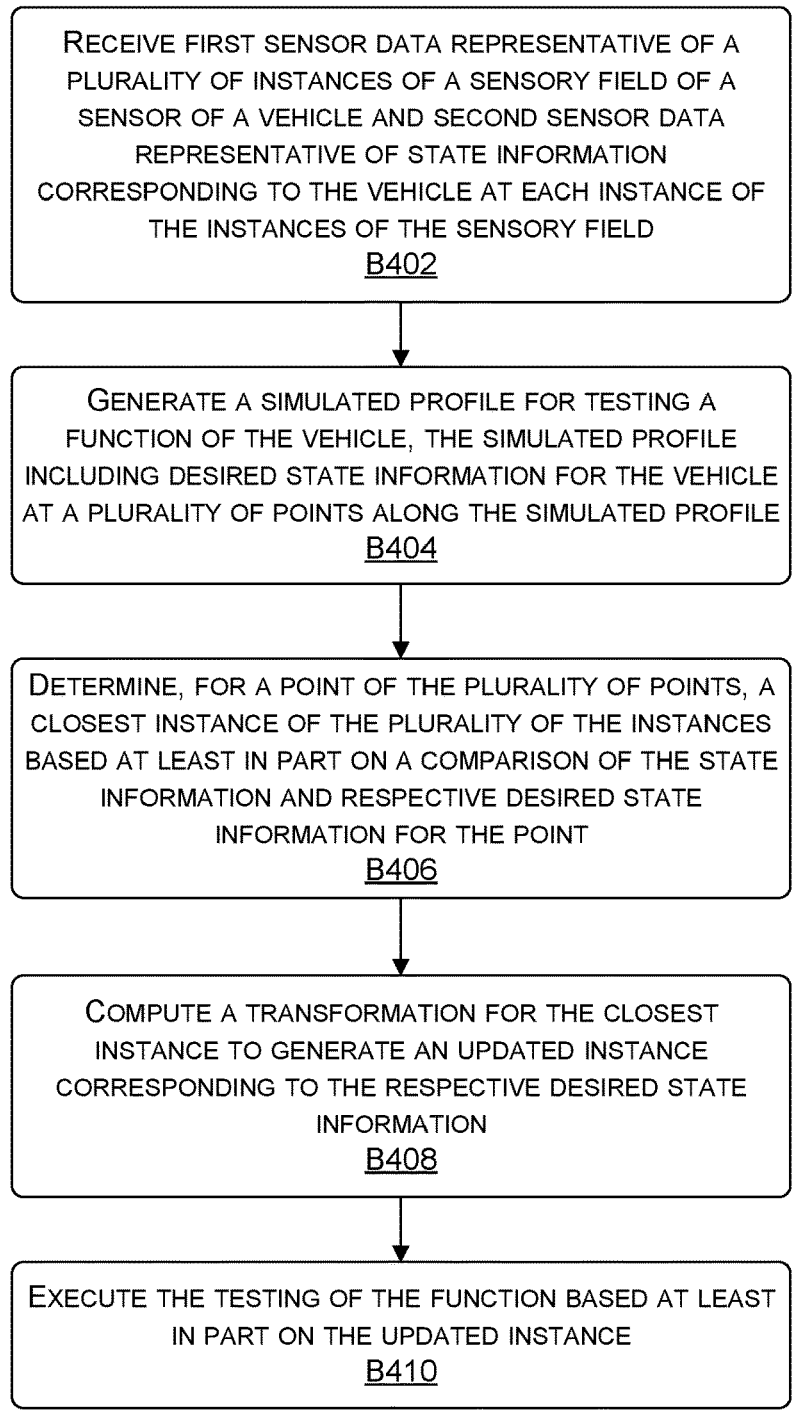
FIGS. 4-5 include flow diagrams illustrating example processes for testing functions of a vehicle, in accordance with some embodiments of the present disclosure.
Figure 5:
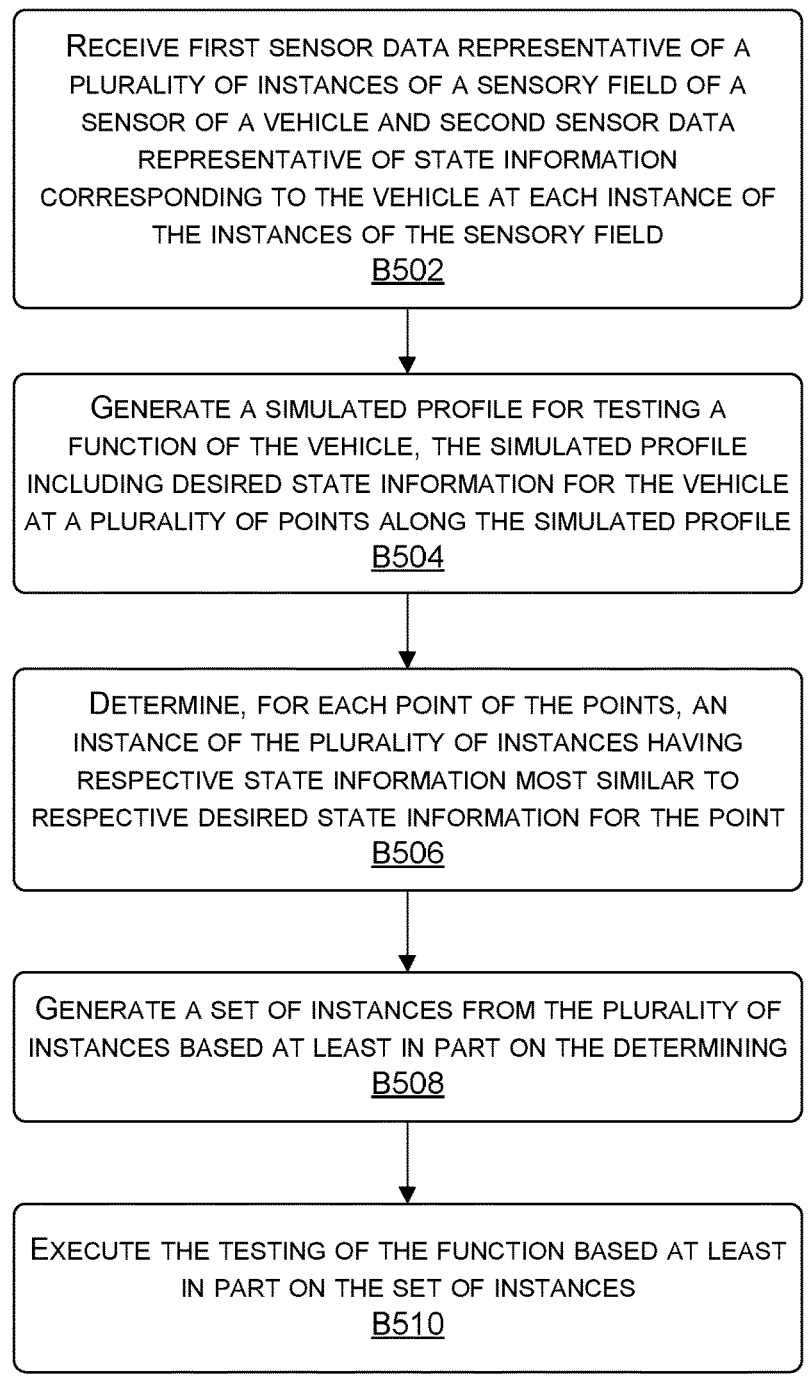

Now referring to FIGS. 4 and 5, each block of methods 400 and 500, described herein, comprises a computing process that may be performed using any combination of hardware, firmware, and/or software. For instance, various functions may be carried out by a processor executing instructions stored in memory. The methods 400 and 500 may also be embodied as computer-usable instructions stored on computer storage media. The methods may be provided by a standalone application, a service or hosted service (standalone or in combination with another hosted service), or a plug-in to another product, to name a few. In addition, methods 400 and 500 are described, by way of example, with respect to the process of FIG. 1 and the vehicle 600. However, these methods 400 and 500 may additionally or alternatively be executed by any one system or within any one process, or any combination of systems and processes, including, but not limited to, those described herein.

FIG. 4 is a flow diagram showing a method 400 for testing a function of a vehicle, in accordance with some embodiments of the present disclosure. The method 400, at block B402, includes receiving first sensor data representative of a plurality of instances of a sensory field of a sensor of a vehicle and second sensor data representative of state information corresponding to the vehicle at each instance of the instances of the sensory field. For example, recorded instance(s) 102A representative of a plurality of instances of a sensory field of a sensor of vehicle 600 and recorded state information 102B representative of state information corresponding to the vehicle 600 at each instance of the recorded instance(s) 102A may be received, accessed, and/or generated.

The method 400, at block B404, includes generating a simulated profile for testing a function of the vehicle, the simulated profile including desired state information for the vehicle at a plurality of points along the simulated profile. For example, the simulation profile for testing the vehicle function 112 of the vehicle 600 may be generated. The simulation profile may include desired state information 104B for the vehicle at simulation point(s) 104A along the simulation profile.

The method 400, at block B406, includes determining, for a point of the plurality of points, a closest instance of the plurality of instances based at least in part on a comparison of the state information and respective desired state information for the point. For example, for each point of the simulation point(s) 104A, a closest instance(s) 106 of the recorded instance(s) 102A may be determined based at least in part on a comparison of the recorded state information 102A and respective desired state information 104B for the simulation point(s) 104A.

The method 400, at block B408, includes computing a transformation for the closest instance to generate an updated instance corresponding to the respective desired state information. For example, the transformer 108 may compute a transformation for the closest instance(s) 106 to generate updated instance(s) 110 corresponding to the respective desired state information 104B.

The method 400, at block B410, includes executing the testing of the function based at least in part on the updated instance. For example, testing of the vehicle function 112 may be executed based at least in part on the updated instance(s) 110 to generate test result(s) 114. Testing of the vehicle function 112 may include loading and/or executing any or all of the updated instance(s) 110, sensor data, recorded instance(s) 102A and state information 102B, simulation profile, simulation point(s) 104A and desired state information 104B to a simulation system for executing testing of the function in a simulated environment.

Now referring to FIG. 5, FIG. 5 is a flow diagram showing a method 500 for testing a function of a vehicle, in accordance with some embodiments of the present disclosure. The method 500, at block B502, includes receiving first sensor data representative of a plurality of instances of a sensory field of a sensor of a vehicle and second sensor data representative of state information corresponding to the vehicle at each instance of the instances of the sensory field. For example, the recorded instance(s) 102A representative of a plurality of instances of a sensory field of a sensor of vehicle 600 and recorded state information 102B representative of state information corresponding to the vehicle 600 at each instance of the recorded instance(s) 102A may be received, accessed, and/or generated.

The method 500, at block B504, includes generating a simulated profile for testing a function of the vehicle, the simulated profile including desired state information for the vehicle at a plurality of points along the simulated profile. For example, the simulation profile for testing the vehicle function 112 of the vehicle 600 may be generated. The simulation profile may include desired state information 104B for the vehicle at simulation point(s) 104A along the simulation profile.

The method 500, at block B506, includes determining, for each point of the points, an instance of the plurality of instances having respective state information most similar to respective desired state information for the point. For example, for each point of the simulation point(s) 104A, a closest instance(s) 106 of the recorded instance(s) 102A having respective recorded state information 102B most similar to respective desired state information 104B for that point may be determined.

The method 500, at block B508, includes generating a set of instances from the plurality of instances based at least in part on the determining. For examples, updated instance(s) 110 may be selected—e.g., without transformation or other operations—from the closest instance(s) 106 and/or the instance(s) generated by the transformer 108 based at least in part on the closest instance(s) 106.

The method 500, at block B510, includes executing the testing of the function based at least in part on the set of instances. For example, testing of the vehicle function 112 may be executed based at least in part on the updated instance(s) 110 to generate test result(s) 114.

Example Autonomous Vehicle

FIG. 6A is an illustration of an example autonomous vehicle 600, in accordance with some embodiments of the present disclosure. The autonomous vehicle 600 (alternatively referred to herein as the "vehicle 600") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 600 may be capable of functionality in accordance with one or more of Level 3-Level 5 of the autonomous driving levels. For example, the vehicle 600 may be capable of conditional automation (Level 3), high automation (Level 4), and/or full automation (Level 5), depending on the embodiment.

The vehicle 600 may include components such as a chassis, a vehicle body, wheels (e.g., 2, 4, 6, 8, 18, etc.), tires, axles, and other components of a vehicle. The vehicle 600 may include a propulsion system 650, such as an internal combustion engine, hybrid electric power plant, an all-electric engine, and/or another propulsion system type. The propulsion system 650 may be connected to a drive train of the vehicle 600, which may include a transmission, to enable the propulsion of the vehicle 600. The propulsion system 650 may be controlled in response to receiving signals from the throttle/accelerator 652.

A steering system 654, which may include a steering wheel, may be used to steer the vehicle 600 (e.g., along a desired path or route) when the propulsion system 650 is operating (e.g., when the vehicle is in motion). The steering system 654 may receive signals from a steering actuator 656. The steering wheel may be optional for full automation (Level 5) functionality.

The brake sensor system 646 may be used to operate the vehicle brakes in response to receiving signals from the brake actuators 648 and/or brake sensors.

Controller(s) 636, which may include one or more system on chips (SoCs) 604 (FIG. 6C) and/or GPU(s), may provide signals (e.g., representative of commands) to one or more components and/or systems of the vehicle 600. For example, the controller(s) may send signals to operate the vehicle brakes via one or more brake actuators 648, to operate the steering system 654 via one or more steering actuators 656, to operate the propulsion system 650 via one or more throttle/accelerators 652. The controller(s) 636 may include one or more onboard (e.g., integrated) computing devices (e.g., supercomputers) that process sensor signals, and output operation commands (e.g., signals representing commands) to enable autonomous driving and/or to assist a human driver in driving the vehicle 600. The controller(s) 636 may include a first controller 636 for autonomous driving functions, a second controller 636 for functional safety functions, a third controller 636 for artificial intelligence functionality (e.g., computer vision), a fourth controller 636 for infotainment functionality, a fifth controller 636 for redundancy in emergency conditions, and/or other controllers. In some examples, a single controller 636 may handle two or more of the above functionalities, two or more controllers 636 may handle a single functionality, and/or any combination thereof.

The controller(s) 636 may provide the signals for controlling one or more components and/or systems of the vehicle 600 in response to sensor data received from one or more sensors (e.g., sensor inputs). The sensor data may be received from, for example and without limitation, global navigation satellite systems sensor(s) 658 (e.g., Global Positioning System sensor(s)), RADAR sensor(s) 660, ultrasonic sensor(s) 662, LIDAR sensor(s) 664, inertial measurement unit (IMU) sensor(s) 666 (e.g., accelerometer(s), gyroscope(s), magnetic compass(es), magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range and/or mid-range camera(s) 698, speed sensor(s) 644 (e.g., for measuring the speed of the vehicle 600), vibration sensor(s) 642, steering sensor(s) 640, brake sensor(s) (e.g., as part of the brake sensor system 646), and/or other sensor types.

One or more of the controller(s) 636 may receive inputs (e.g., represented by input data) from an instrument cluster 632 of the vehicle 600 and provide outputs (e.g., represented by output data, display data, etc.) via a human-machine interface (HMI) display 634, an audible annunciator, a loudspeaker, and/or via other components of the vehicle 600. The outputs may include information such as vehicle velocity, speed, time, map data (e.g., the HD map 622 of FIG. 6C), location data (e.g., the vehicle's 600 location, such as on a map), direction, location of other vehicles (e.g., an occupancy grid), information about objects and status of objects as perceived by the controller(s) 636, etc. For example, the HMI display 634 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 600 further includes a network interface 624 which may use one or more wireless antenna(s) 626 and/or modem(s) to communicate over one or more networks. For example, the network interface 624 may be capable of communication over LTE, WCDMA, UMTS, GSM, CDMA2000, etc. The wireless antenna(s) 626 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

FIG. 6B is an example of camera locations and fields of view for the example autonomous vehicle 600 of FIG. 6A, in accordance with some embodiments of the present disclosure. The cameras and respective fields of view are one example embodiment and are not intended to be limiting. For example, additional and/or alternative cameras may be included and/or the cameras may be located at different locations on the vehicle 600.

The camera types for the cameras may include, but are not limited to, digital cameras that may be adapted for use with the components and/or systems of the vehicle 600. The camera(s) may operate at automotive safety integrity level (ASIL) B and/or at another ASIL. The camera types may be capable of any image capture rate, such as 60 frames per second (fps), 620 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 600 (e.g., front-facing cameras) may be used for surround view, to help identify forward facing paths and obstacles, as well aid in, with the help of one or more controllers 636 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 670 that may be used to perceive objects coming into view from the periphery (e.g., pedestrians, crossing traffic or bicycles). Although only one wide-view camera is illustrated in FIG. 6B, there may any number of wide-view cameras 670 on the vehicle 600. In addition, long-range camera(s) 698 (e.g., a long-view stereo camera pair) may be used for depth-based object detection, especially for objects for which a neural network has not yet been trained. The long-range camera(s) 698 may also be used for object detection and classification, as well as basic object tracking.

One or more stereo cameras 668 may also be included in a front-facing configuration. The stereo camera(s) 668 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 668 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 668 may be used in addition to, or alternatively from, those described herein.

Cameras with a field of view that include portions of the environment to the side of the vehicle 600 (e.g., side-view cameras) may be used for surround view, providing information used to create and update the occupancy grid, as well as to generate side impact collision warnings. For example, surround camera(s) 674 (e.g., four surround cameras 674 as illustrated in FIG. 6B) may be positioned to on the vehicle 600. The surround camera(s) 674 may include wide-view camera(s) 670, fisheye camera(s), 360 degree camera(s), and/or the like. Four example, four fisheye cameras may be positioned on the vehicle's front, rear, and sides. In an alternative arrangement, the vehicle may use three surround camera(s) 674 (e.g., left, right, and rear), and may leverage one or more other camera(s) (e.g., a forward-facing camera) as a fourth surround view camera.

Cameras with a field of view that include portions of the environment to the rear of the vehicle 600 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 698, stereo camera(s) 668), infrared camera(s) 672, etc.), as described herein.

FIG. 6C is a block diagram of an example system architecture for the example autonomous vehicle 600 of FIG. 6A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 600 in FIG. 6C are illustrated as being connected via bus 602. The bus 602 may include a Controller Area Network (CAN) data interface (alternatively referred to herein as a "CAN bus"). A CAN may be a network inside the vehicle 600 used to aid in control of various features and functionality of the vehicle 600, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 602 is described herein as being a CAN bus, this is not intended to be limiting. For example, in addition to, or alternatively from, the CAN bus, FlexRay and/or Ethernet may be used. Additionally, although a single line is used to represent the bus 602, this is not intended to be limiting. For example, there may be any number of busses 602, which may include one or more CAN busses, one or more FlexRay busses, one or more Ethernet busses, and/or one or more other types of busses using a different protocol. In some examples, two or more busses 602 may be used to perform different functions, and/or may be used for redundancy. For example, a first bus 602 may be used for collision avoidance functionality and a second bus 602 may be used for actuation control. In any example, each bus 602 may communicate with any of the components of the vehicle 600, and two or more busses 602 may communicate with the same components. In some examples, each SoC 604, each controller 636, and/or each computer within the vehicle may have access to the same input data (e.g., inputs from sensors of the vehicle 600), and may be connected to a common bus, such the CAN bus.

The vehicle 600 may include one or more controller(s) 636, such as those described herein with respect to FIG. 6A. The controller(s) 636 may be used for a variety of functions. The controller(s) 636 may be coupled to any of the various other components and systems of the vehicle 600, and may be used for control of the vehicle 600, artificial intelligence of the vehicle 600, infotainment for the vehicle 600, and/or the like.

The vehicle 600 may include a system(s) on a chip (SoC) 604. The SoC 604 may include CPU(s) 606, GPU(s) 608, processor(s) 610, cache(s) 612, accelerator(s) 614, data store(s) 616, and/or other components and features not illustrated. The SoC(s) 604 may be used to control the vehicle 600 in a variety of platforms and systems. For example, the SoC(s) 604 may be combined in a system (e.g., the system of the vehicle 600) with an HD map 622 which may obtain map refreshes and/or updates via a network interface 624 from one or more servers (e.g., server(s) 678 of FIG. 6D).

The CPU(s) 606 may include a CPU cluster or CPU complex (alternatively referred to herein as a "CCPLEX"). The CPU(s) 606 may include multiple cores and/or L2 caches. For example, in some embodiments, the CPU(s) 606 may include eight cores in a coherent multi-processor configuration. In some embodiments, the CPU(s) 606 may include four dual-core clusters where each cluster has a dedicated L2 cache (e.g., a 2 MB L2 cache). The CPU(s) 606 (e.g., the CCPLEX) may be configured to support simultaneous cluster operation enabling any combination of the clusters of the CPU(s) 606 to be active at any given time.

The CPU(s) 606 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 606 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 608 may include an integrated GPU (alternatively referred to herein as an "iGPU"). The GPU(s) 608 may be programmable and may be efficient for parallel workloads. The GPU(s) 608, in some examples, may use an enhanced tensor instruction set. The GPU(s) 608 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 608 may include at least eight streaming microprocessors. The GPU(s) 608 may use compute application programming interface(s) (API(s)). In addition, the GPU(s) 608 may use one or more parallel computing platforms and/or programming models (e.g., NVIDIA's CUDA).

The GPU(s) 608 may be power-optimized for best performance in automotive and embedded use cases. For example, the GPU(s) 608 may be fabricated on a Fin field-effect transistor (FinFET). However, this is not intended to be limiting and the GPU(s) 608 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 608 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 608 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 608 to access the CPU(s) 606 page tables directly. In such examples, when the GPU(s) 608 memory management unit (MMU) experiences a miss, an address translation request may be transmitted to the CPU(s) 606. In response, the CPU(s) 606 may look in its page tables for the virtual-to-physical mapping for the address and transmits the translation back to the GPU(s) 608. As such, unified memory technology may allow a single unified virtual address space for memory of both the CPU(s) 606 and the GPU(s) 608, thereby simplifying the GPU(s) 608 programming and porting of applications to the GPU(s) 608.

In addition, the GPU(s) 608 may include an access counter that may keep track of the frequency of access of the GPU(s) 608 to memory of other processors. The access counter may help ensure that memory pages are moved to the physical memory of the processor that is accessing the pages most frequently.

The SoC(s) 604 may include any number of cache(s) 612, including those described herein. For example, the cache(s) 612 may include an L3 cache that is available to both the CPU(s) 606 and the GPU(s) 608 (e.g., that is connected both the CPU(s) 606 and the GPU(s) 608). The cache(s) 612 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 604 may include an arithmetic logic unit(s) (ALU(s)) which may be leveraged in performing processing with respect to any of the variety of tasks or operations of the vehicle 600—such as processing DNNs. In addition, the SoC(s) 604 may include a floating point unit(s) (FPU(s))— or other math coprocessor or numeric coprocessor types—for performing mathematical operations within the system. For example, the SoC(s) 104 may include one or more FPUs integrated as execution units within a CPU(s) 606 and/or GPU(s) 608.

The SoC(s) 604 may include one or more accelerators 614 (e.g., hardware accelerators, software accelerators, or a combination thereof). For example, the SoC(s) 604 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 608 and to off-load some of the tasks of the GPU(s) 608 (e.g., to free up more cycles of the GPU(s) 608 for performing other tasks). As an example, the accelerator(s) 614 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 614 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 608, and by using an inference accelerator, for example, a designer may target either the DLA(s) or the GPU(s) 608 for any function. For example, the designer may focus processing of CNNs and floating point operations on the DLA(s) and leave other functions to the GPU(s) 608 and/or other accelerator(s) 614.

The accelerator(s) 614 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 606. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 614 (e.g., the hardware acceleration cluster) may include a computer vision network on-chip and SRAM, for providing a high-bandwidth, low latency SRAM for the accelerator(s) 614. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 604 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 614 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 666 output that correlates with the vehicle 600 orientation, distance, 3D location estimates of the object obtained from the neural network and/or other sensors (e.g., LIDAR sensor(s) 664 or RADAR sensor(s) 660), among others.

The SoC(s) 604 may include data store(s) 616 (e.g., memory). The data store(s) 616 may be on-chip memory of the SoC(s) 604, which may store neural networks to be executed on the GPU and/or the DLA. In some examples, the data store(s) 616 may be large enough in capacity to store multiple instances of neural networks for redundancy and safety. The data store(s) 612 may comprise L2 or L3 cache(s) 612. Reference to the data store(s) 616 may include reference to the memory associated with the PVA, DLA, and/or other accelerator(s) 614, as described herein.

The SoC(s) 604 may include one or more processor(s) 610 (e.g., embedded processors). The processor(s) 610 may include a boot and power management processor that may be a dedicated processor and subsystem to handle boot power and management functions and related security enforcement. The boot and power management processor may be a part of the SoC(s) 604 boot sequence and may provide runtime power management services. The boot power and management processor may provide clock and voltage programming, assistance in system low power state transitions, management of SoC(s) 604 thermals and temperature sensors, and/or management of the SoC(s) 604 power states. Each temperature sensor may be implemented as a ring-oscillator whose output frequency is proportional to temperature, and the SoC(s) 604 may use the ring-oscillators to detect temperatures of the CPU(s) 606, GPU(s) 608, and/or accelerator(s) 614. If temperatures are determined to exceed a threshold, the boot and power management processor may enter a temperature fault routine and put the SoC(s) 604 into a lower power state and/or put the vehicle 600 into a chauffeur to safe stop mode (e.g., bring the vehicle 600 to a safe stop).

The processor(s) 610 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 610 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 610 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 610 may further include a real-time camera engine that may include a dedicated processor subsystem for handling real-time camera management.

The processor(s) 610 may further include a high-dynamic range signal processor that may include an image signal processor that is a hardware engine that is part of the camera processing pipeline.

The processor(s) 610 may include a video image compositor that may be a processing block (e.g., implemented on a microprocessor) that implements video post-processing functions needed by a video playback application to produce the final image for the player window. The video image compositor may perform lens distortion correction on wide-view camera(s) 670, surround camera(s) 674, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 608 is not required to continuously render new surfaces. Even when the GPU(s) 608 is powered on and active doing 3D rendering, the video image compositor may be used to offload the GPU(s) 608 to improve performance and responsiveness.

The SoC(s) 604 may further include a mobile industry processor interface (MIPI) camera serial interface for receiving video and input from cameras, a high-speed interface, and/or a video input block that may be used for camera and related pixel input functions. The SoC(s) 604 may further include an input/output controller(s) that may be controlled by software and may be used for receiving I/O signals that are uncommitted to a specific role.

The SoC(s) 604 may further include a broad range of peripheral interfaces to enable communication with peripherals, audio codecs, power management, and/or other devices. The SoC(s) 604 may be used to process data from cameras (e.g., connected over Gigabit Multimedia Serial Link and Ethernet), sensors (e.g., LIDAR sensor(s) 664, RADAR sensor(s) 660, etc. that may be connected over Ethernet), data from bus 602 (e.g., speed of vehicle 600, steering wheel position, etc.), data from GNSS sensor(s) 658 (e.g., connected over Ethernet or CAN bus). The SoC(s) 604 may further include dedicated high-performance mass storage controllers that may include their own DMA engines, and that may be used to free the CPU(s) 606 from routine data management tasks.

The SoC(s) 604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 604 may be faster, more reliable, and even more energy-efficient and space-efficient than conventional systems. For example, the accelerator(s) 614, when combined with the CPU(s) 606, the GPU(s) 608, and the data store(s) 616, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 620) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 608.

In some examples, a CNN for facial recognition and vehicle owner identification may use data from camera sensors to identify the presence of an authorized driver and/or owner of the vehicle 600. The always on sensor processing engine may be used to unlock the vehicle when the owner approaches the driver door and turn on the lights, and, in security mode, to disable the vehicle when the owner leaves the vehicle. In this way, the SoC(s) 604 provide for security against theft and/or carjacking.

In another example, a CNN for emergency vehicle detection and identification may use data from microphones 696 to detect and identify emergency vehicle sirens. In contrast to conventional systems, that use general classifiers to detect sirens and manually extract features, the SoC(s) 604 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 658. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 662, until the emergency vehicle(s) passes.

The vehicle may include a CPU(s) 618 (e.g., discrete CPU(s), or dCPU(s)), that may be coupled to the SoC(s) 604 via a high-speed interconnect (e.g., PCIe). The CPU(s) 618 may include an X86 processor, for example. The CPU(s) 618 may be used to perform any of a variety of functions, including arbitrating potentially inconsistent results between ADAS sensors and the SoC(s) 604, and/or monitoring the status and health of the controller(s) 636 and/or infotainment SoC 630, for example.

The vehicle 600 may include a GPU(s) 620 (e.g., discrete GPU(s), or dGPU(s)), that may be coupled to the SoC(s) 604 via a high-speed interconnect (e.g., NVIDIA's NVLINK). The GPU(s) 620 may provide additional artificial intelligence functionality, such as by executing redundant and/or different neural networks, and may be used to train and/or update neural networks based on input (e.g., sensor data) from sensors of the vehicle 600.

The vehicle 600 may further include the network interface 624 which may include one or more wireless antennas 626 (e.g., one or more wireless antennas for different communication protocols, such as a cellular antenna, a Bluetooth antenna, etc.). The network interface 624 may be used to enable wireless connectivity over the Internet with the cloud (e.g., with the server(s) 678 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 600 information about vehicles in proximity to the vehicle 600 (e.g., vehicles in front of, on the side of, and/or behind the vehicle 600). This functionality may be part of a cooperative adaptive cruise control functionality of the vehicle 600.

The network interface 624 may include a SoC that provides modulation and demodulation functionality and enables the controller(s) 636 to communicate over wireless networks. The network interface 624 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 600 may further include data store(s) 628 which may include off-chip (e.g., off the SoC(s) 604) storage. The data store(s) 628 may include one or more storage elements including RAM, SRAM, DRAM, VRAM, Flash, hard disks, and/or other components and/or devices that may store at least one bit of data.

The vehicle 600 may further include GNSS sensor(s) 658. The GNSS sensor(s) 658 (e.g., GPS, assisted GPS sensors, differential GPS (DGPS) sensors, etc.), to assist in mapping, perception, occupancy grid generation, and/or path planning functions. Any number of GNSS sensor(s) 658 may be used, including, for example and without limitation, a GPS using a USB connector with an Ethernet to Serial (RS-232) bridge.

The vehicle 600 may further include RADAR sensor(s) 660. The RADAR sensor(s) 660 may be used by the vehicle 600 for long-range vehicle detection, even in darkness and/or severe weather conditions. RADAR functional safety levels may be ASIL B. The RADAR sensor(s) 660 may use the CAN and/or the bus 602 (e.g., to transmit data generated by the RADAR sensor(s) 660) for control and to access object tracking data, with access to Ethernet to access raw data in some examples. A wide variety of RADAR sensor types may be used. For example, and without limitation, the RADAR sensor(s) 660 may be suitable for front, rear, and side RADAR use. In some example, Pulse Doppler RADAR sensor(s) are used.

The RADAR sensor(s) 660 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 660 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 600 surroundings at higher speeds with minimal interference from traffic in adjacent lanes. The other two antennae may expand the field of view, making it possible to quickly detect vehicles entering or leaving the vehicle's 600 lane.

Mid-range RADAR systems may include, as an example, a range of up to 660 m (front) or 80 m (rear), and a field of view of up to 42 degrees (front) or 650 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 600 may further include ultrasonic sensor(s) 662. The ultrasonic sensor(s) 662, which may be positioned at the front, back, and/or the sides of the vehicle 600, may be used for park assist and/or to create and update an occupancy grid. A wide variety of ultrasonic sensor(s) 662 may be used, and different ultrasonic sensor(s) 662 may be used for different ranges of detection (e.g., 2.5 m, 4 m). The ultrasonic sensor(s) 662 may operate at functional safety levels of ASIL B.

The vehicle 600 may include LIDAR sensor(s) 664. The LIDAR sensor(s) 664 may be used for object and pedestrian detection, emergency braking, collision avoidance, and/or other functions. The LIDAR sensor(s) 664 may be functional safety level ASIL B. In some examples, the vehicle 600 may include multiple LIDAR sensors 664 (e.g., two, four, six, etc.) that may use Ethernet (e.g., to provide data to a Gigabit Ethernet switch).

In some examples, the LIDAR sensor(s) 664 may be capable of providing a list of objects and their distances for a 360-degree field of view. Commercially available LIDAR sensor(s) 664 may have an advertised range of approximately 600 m, with an accuracy of 2 cm-3 cm, and with support for a 600 Mbps Ethernet connection, for example. In some examples, one or more non-protruding LIDAR sensors 664 may be used. In such examples, the LIDAR sensor(s) 664 may be implemented as a small device that may be embedded into the front, rear, sides, and/or corners of the vehicle 600. The LIDAR sensor(s) 664, in such examples, may provide up to a 620-degree horizontal and 35-degree vertical field-of-view, with a 200 m range even for low-reflectivity objects. Front-mounted LIDAR sensor(s) 664 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 600. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 664 may be less susceptible to motion blur, vibration, and/or shock.

The vehicle may further include IMU sensor(s) 666. The IMU sensor(s) 666 may be located at a center of the rear axle of the vehicle 600, in some examples. The IMU sensor(s) 666 may include, for example and without limitation, an accelerometer(s), a magnetometer(s), a gyroscope(s), a magnetic compass(es), and/or other sensor types. In some examples, such as in six-axis applications, the IMU sensor(s) 666 may include accelerometers and gyroscopes, while in nine-axis applications, the IMU sensor(s) 666 may include accelerometers, gyroscopes, and magnetometers.

In some embodiments, the IMU sensor(s) 666 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 666 may enable the vehicle 600 to estimate heading without requiring input from a magnetic sensor by directly observing and correlating the changes in velocity from GPS to the IMU sensor(s) 666. In some examples, the IMU sensor(s) 666 and the GNSS sensor(s) 658 may be combined in a single integrated unit.

The vehicle may include microphone(s) 696 placed in and/or around the vehicle 600. The microphone(s) 696 may be used for emergency vehicle detection and identification, among other things.

The vehicle may further include any number of camera types, including stereo camera(s) 668, wide-view camera(s) 670, infrared camera(s) 672, surround camera(s) 674, long-range and/or mid-range camera(s) 698, and/or other camera types. The cameras may be used to capture image data around an entire periphery of the vehicle 600. The types of cameras used depends on the embodiments and requirements for the vehicle 600, and any combination of camera types may be used to provide the necessary coverage around the vehicle 600. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 6A and FIG. 6B.

The vehicle 600 may further include vibration sensor(s) 642. The vibration sensor(s) 642 may measure vibrations of components of the vehicle, such as the axle(s). For example, changes in vibrations may indicate a change in road surfaces. In another example, when two or more vibration sensors 642 are used, the differences between the vibrations may be used to determine friction or slippage of the road surface (e.g., when the difference in vibration is between a power-driven axle and a freely rotating axle).

The vehicle 600 may include an ADAS system 638. The ADAS system 638 may include a SoC, in some examples. The ADAS system 638 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 660, LIDAR sensor(s) 664, and/or a camera(s). The ACC systems may include longitudinal ACC and/or lateral ACC. Longitudinal ACC monitors and controls the distance to the vehicle immediately ahead of the vehicle 600 and automatically adjust the vehicle speed to maintain a safe distance from vehicles ahead. Lateral ACC performs distance keeping, and advises the vehicle 600 to change lanes when necessary. Lateral ACC is related to other ADAS applications such as LCA and CWS.

CACC uses information from other vehicles that may be received via the network interface 624 and/or the wireless antenna(s) 626 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 600), while the I2V communication concept provides information about traffic further ahead. CACC systems may include either or both I2V and V2V information sources. Given the information of the vehicles ahead of the vehicle 600, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 660, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 660, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 600 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 600 if the vehicle 600 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 660, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 600 is backing up. Some RCTW systems include AEB to ensure that the vehicle brakes are applied to avoid a crash. RCTW systems may use one or more rear-facing RADAR sensor(s) 660, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly.

However, in an autonomous vehicle 600, the vehicle 600 itself must, in the case of conflicting results, decide whether to heed the result from a primary computer or a secondary computer (e.g., a first controller 636 or a second controller 636). For example, in some embodiments, the ADAS system 638 may be a backup and/or secondary computer for providing perception information to a backup computer rationality module. The backup computer rationality monitor may run a redundant diverse software on hardware components to detect faults in perception and dynamic driving tasks. Outputs from the ADAS system 638 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 604.

In other examples, ADAS system 638 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 638 may be fed into the primary computer's perception block and/or the primary computer's dynamic driving task block. For example, if the ADAS system 638 indicates a forward crash warning due to an object immediately ahead, the perception block may use this information when identifying objects. In other examples, the secondary computer may have its own neural network which is trained and thus reduces the risk of false positives, as described herein.

The vehicle 600 may further include the infotainment SoC 630 (e.g., an in-vehicle infotainment system (IVI)). Although illustrated and described as a SoC, the infotainment system may not be a SoC, and may include two or more discrete components. The infotainment SoC 630 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 600. For example, the infotainment SoC 630 may radios, disk players, navigation systems, video players, USB and Bluetooth connectivity, carputers, in-car entertainment, Wi-Fi, steering wheel audio controls, hands free voice control, a heads-up display (HUD), an HMI display 634, a telematics device, a control panel (e.g., for controlling and/or interacting with various components, features, and/or systems), and/or other components. The infotainment SoC 630 may further be used to provide information (e.g., visual and/or audible) to a user(s) of the vehicle, such as information from the ADAS system 638, autonomous driving information such as planned vehicle maneuvers, trajectories, surrounding environment information (e.g., intersection information, vehicle information, road information, etc.), and/or other information.

The infotainment SoC 630 may include GPU functionality. The infotainment SoC 630 may communicate over the bus 602 (e.g., CAN bus, Ethernet, etc.) with other devices, systems, and/or components of the vehicle 600. In some examples, the infotainment SoC 630 may be coupled to a supervisory MCU such that the GPU of the infotainment system may perform some self-driving functions in the event that the primary controller(s) 636 (e.g., the primary and/or backup computers of the vehicle 600) fail. In such an example, the infotainment SoC 630 may put the vehicle 600 into a chauffeur to safe stop mode, as described herein.

The vehicle 600 may further include an instrument cluster 632 (e.g., a digital dash, an electronic instrument cluster, a digital instrument panel, etc.). The instrument cluster 632 may include a controller and/or supercomputer (e.g., a discrete controller or supercomputer). The instrument cluster 632 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 630 and the instrument cluster 632. In other words, the instrument cluster 632 may be included as part of the infotainment SoC 630, or vice versa.

Figure 6D:
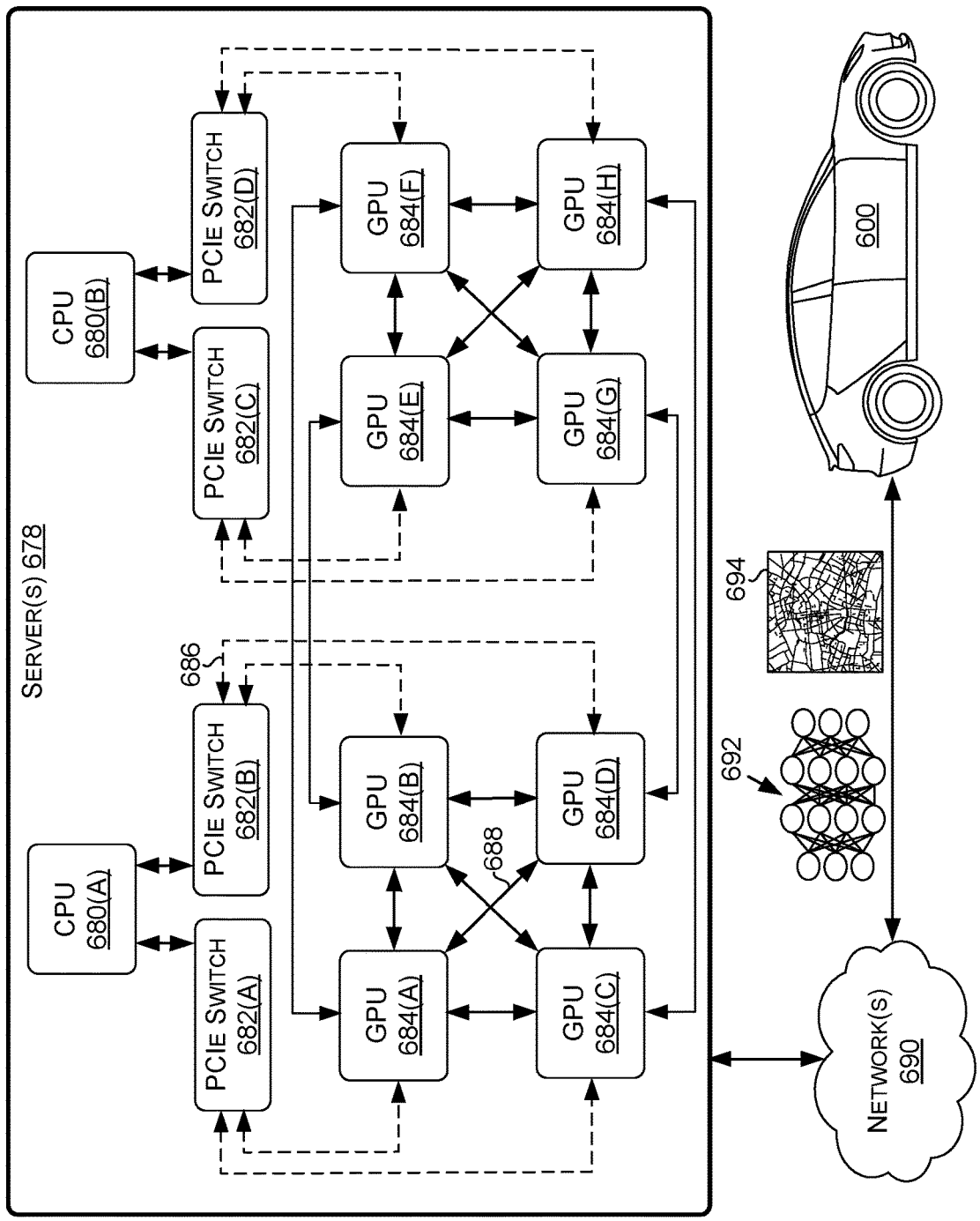
FIG. 6D is a system diagram for communication between cloud-based server(s) and the example autonomous vehicle of FIG. 6A, in accordance with some embodiments of the present disclosure.

FIG. 6D is a system diagram for communication between cloud-based server(s) and the example autonomous vehicle 600 of FIG. 6A, in accordance with some embodiments of the present disclosure. The system 676 may include server(s) 678, network(s) 690, and vehicles, including the vehicle 600. The server(s) 678 may include a plurality of GPUs 684(A)-684(H) (collectively referred to herein as GPUs 684), PCIe switches 682(A)-682(H) (collectively referred to herein as PCIe switches 682), and/or CPUs 680(A)-680(B) (collectively referred to herein as CPUs 680). The GPUs 684, the CPUs 680, and the PCIe switches may be interconnected with high-speed interconnects such as, for example and without limitation, NVLink interfaces 688 developed by NVIDIA and/or PCIe connections 686. In some examples, the GPUs 684 are connected via NVLink and/or NVSwitch SoC and the GPUs 684 and the PCIe switches 682 are connected via PCIe interconnects. Although eight GPUs 684, two CPUs 680, and two PCIe switches are illustrated, this is not intended to be limiting. Depending on the embodiment, each of the server(s) 678 may include any number of GPUs 684, CPUs 680, and/or PCIe switches. For example, the server(s) 678 may each include eight, sixteen, thirty-two, and/or more GPUs 684.

The server(s) 678 may receive, over the network(s) 690 and from the vehicles, image data representative of images showing unexpected or changed road conditions, such as recently commenced road-work. The server(s) 678 may transmit, over the network(s) 690 and to the vehicles, neural networks 692, updated neural networks 692, and/or map information 694, including information regarding traffic and road conditions. The updates to the map information 694 may include updates for the HD map 622, such as information regarding construction sites, potholes, detours, flooding, and/or other obstructions. In some examples, the neural networks 692, the updated neural networks 692, and/or the map information 694 may have resulted from new training and/or experiences represented in data received from any number of vehicles in the environment, and/or based on training performed at a datacenter (e.g., using the server(s) 678 and/or other servers).

The server(s) 678 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 690, and/or the machine learning models may be used by the server(s) 678 to remotely monitor the vehicles.

In some examples, the server(s) 678 may receive data from the vehicles and apply the data to up-to-date real-time neural networks for real-time intelligent inferencing. The server(s) 678 may include deep-learning supercomputers and/or dedicated AI computers powered by GPU(s) 684, such as a DGX and DGX Station machines developed by NVIDIA. However, in some examples, the server(s) 678 may include deep learning infrastructure that use only CPU-powered datacenters.

The deep-learning infrastructure of the server(s) 678 may be capable of fast, real-time inferencing, and may use that capability to evaluate and verify the health of the processors, software, and/or associated hardware in the vehicle 600. For example, the deep-learning infrastructure may receive periodic updates from the vehicle 600, such as a sequence of images and/or objects that the vehicle 600 has located in that sequence of images (e.g., via computer vision and/or other machine learning object classification techniques). The deep-learning infrastructure may run its own neural network to identify the objects and compare them with the objects identified by the vehicle 600 and, if the results do not match and the infrastructure concludes that the AI in the vehicle 600 is malfunctioning, the server(s) 678 may transmit a signal to the vehicle 600 instructing a fail-safe computer of the vehicle 600 to assume control, notify the passengers, and complete a safe parking maneuver.

For inferencing, the server(s) 678 may include the GPU(s) 684 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device

700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
receiving first sensor data representative of a plurality of instances of a sensory field of a sensor of a vehicle and second sensor data representative of state information corresponding to the vehicle at individual instances of the plurality of instances of the sensory field;
generating a simulated profile for testing a function of the vehicle, the simulated profile including desired state information for a virtual instance of the vehicle at a point of a plurality of points along the simulated profile;
determining, for the point of the plurality of points, a closest instance of the plurality of instances of the first sensor data based at least on a comparison of the state information and the desired state information for the point;
computing a transformation for the closest instance to generate an updated instance corresponding to the desired state information; and
executing the testing of the function based at least on the updated instance.

2. The method of claim 1, wherein:
the state information represents at least one of a first speed, a first location, or a first pose of the vehicle;
the desired state information represents at least one of a second speed, a second location, or a second pose for the virtual instance of the vehicle; and
the comparison of the state information to the desired state information comprises comparing at least one of the first speed to the second speed, the first location to the second location, or the first pose to the second pose.

3. The method of claim 1, wherein the first sensor data is captured as the vehicle approaches or moves away from an object at a substantially constant speed.

4. The method of claim 1, wherein the function corresponds to at least one of an automatic emergency braking (AEB) system, a collision mitigation warning (CMW) system, an automatic lane departure warning system, an automatic lane change system, or an adaptive cruise control (ACC) system.

5. The method of claim 1, wherein the transformation includes a viewport transformation for one or more pixels corresponding to the closest instance of the sensory field.

6. The method of claim 1, wherein, when second desired state information is within a threshold similarity to second state information, a second closest instance is used for the executing the testing of the function without computing a second transformation.

7. The method of claim 1, wherein the executing the testing of the function is further based at least on a physics model corresponding to the vehicle.

8. The method of claim 1, wherein the desired state information is determined based at least on a desired initial speed of the vehicle for the executing of the testing.

9. A system comprising:
one or more processing units to:
receive first sensor data representative of a plurality of instances of a sensory field of a sensor of a vehicle and second sensor data representative of state information corresponding to an instance of the plurality of instances of the sensory field;
generate a simulated trajectory for testing a function of the vehicle, the simulated trajectory including a plurality of points and desired state information for a virtual instance of the vehicle at a point of the plurality of points along the simulated trajectory;
select the instance of the sensory field based at least on the desired state information for the virtual instance of the vehicle at the point along the simulated trajectory and the state information corresponding to the instance;
generate, based at least on one or more differences between the state information and the desired state information, an updated instance of the first sensor data corresponding to the point; and
execute the testing of the function based at least on the updated instance.

10. The system of claim 9, wherein the selection of the instance of the sensory field comprises:
determining a closest instance of the plurality of instances based at least on a comparison of the state information and the desired state information for the point; and
selecting the instance to include the closest instances.

11. The system of claim 9, wherein the state information represents at least one of a first speed, a first location, or a first orientation of the vehicle, and the desired state information represents at least one of a second speed, a second location, or a second orientation of the virtual instance of the vehicle.

12. The system of claim 9, wherein the generation of the updated instance of the first sensor data comprises computing a transformation for the instance of the first sensor data.

13. The system of claim 12, wherein the transformation includes a viewport transformation for one or more pixels corresponding to the instance of the sensory field based at least on the one or more differences between the state information and the desired state information.

14. The system of claim 9, wherein the function corresponds to at least one of an automatic emergency braking (AEB) system, a collision mitigation warning (CMW) system, an automatic lane departure warning system, an automatic lane change system, or an adaptive cruise control (ACC).

15. A method comprising:
receiving first sensor data representative of at least a first instance of a sensory field of a sensor of a vehicle and a second instance of the sensory field of the sensor of the vehicle;
receiving second sensor data representative of first state information corresponding to the vehicle at the first instance of the sensory field and second state information corresponding to the vehicle at the second instance of the sensory field;
generating a simulated profile for testing a function of the vehicle, the simulated profile including desired state information for the vehicle at a point of a plurality of points along the simulated profile;
determining that the first state information is more similar to the desired state information for the point than the second state information;
generating, based at least on the first state information being more similar to the desired state information than the second state information, a set of instances that includes at least the first instance; and
executing the testing of the function based at least on the set of instances.

16. The method of claim 15, wherein the generating the set of instances further comprises transforming the first instance of the first sensor data.

17. The method of claim 15, wherein the desired state information for the vehicle is determined based at least on a desired initial speed of the vehicle for the executing of the testing.

18. The system of claim 9, wherein the one or more processing units are further to determine the one or more differences between the state information and the desired state information, the one or more differences including one or more of:
a velocity difference between a first velocity of the state information and a second velocity of the desired state information;
a location difference between a first location of the state information and a second location of the desired state information; or
a pose difference between a first pose of the state information and a second pose of the desired state information.

19. The method of claim 15, wherein the determining that the first state information is more similar to the desired state information for the point than the second state information comprises one or more of:
determining that a first velocity difference between a first velocity of the first state information and a second velocity of the desired state information is less than a second velocity difference between a third velocity of the second state information and the second velocity;
determining that a first location difference between a first location of the first state information and a second location of the desired state information is less than a second location difference between a third location of the second state information and the second location; or
determining that a first pose difference between a first pose of the first state information and a second pose of the desired state information is less than a second pose difference between a third pose of the second state information and the second pose.

* * * * *